United States Patent
Nakajima et al.

(10) Patent No.: US 11,024,448 B2
(45) Date of Patent: *Jun. 1, 2021

(54) ALLOY FOR R-T-B-BASED RARE EARTH SINTERED MAGNET, PROCESS OF PRODUCING ALLOY FOR R-T-B-BASED RARE EARTH SINTERED MAGNET, ALLOY MATERIAL FOR R-T-B-BASED RARE EARTH SINTERED MAGNET, R-T-B-BASED RARE EARTH SINTERED MAGNET, PROCESS OF PRODUCING R-T-B-BASED RARE EARTH SINTERED MAGNET, AND MOTOR

(71) Applicant: TDK Corporation, Tokyo (JP)

(72) Inventors: Kenichiro Nakajima, Chichibu (JP); Takashi Yamazaki, Chichibu (JP)

(73) Assignee: TDK CORPORATION, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 15/219,110

(22) Filed: Jul. 25, 2016

(65) Prior Publication Data

US 2017/0025207 A1 Jan. 26, 2017

Related U.S. Application Data

(62) Division of application No. 14/126,770, filed as application No. PCT/JP2012/067367 on Jul. 6, 2012, now abandoned.

(30) Foreign Application Priority Data

Jul. 8, 2011 (JP) .............................. JP2011-151815
Oct. 18, 2011 (JP) .............................. JP2011-229289

(Continued)

(51) Int. Cl.
*H01F 1/057* (2006.01)
*B22F 9/04* (2006.01)
(Continued)

(52) U.S. Cl.
CPC .............. *H01F 1/0536* (2013.01); *B22F 3/16* (2013.01); *B22F 3/24* (2013.01); *C21D 6/00* (2013.01);
(Continued)

(58) Field of Classification Search
None
See application file for complete search history.

(56) References Cited

U.S. PATENT DOCUMENTS

| | | |
|---|---|---|
| 4,684,406 A | 8/1987 | Matsuura et al. |
| 5,666,635 A | 9/1997 | Kaneko et al. |

(Continued)

FOREIGN PATENT DOCUMENTS

| | | |
|---|---|---|
| CN | 1114779 A | 1/1996 |
| CN | 1510700 A | 7/2004 |

(Continued)

OTHER PUBLICATIONS

Machine translation of JP06-302419A. (Year: 1994).*

(Continued)

*Primary Examiner* — Xiaowei Su
(74) *Attorney, Agent, or Firm* — Sughrue Mion, PLLC

(57) ABSTRACT

An alloy for R-T-B-based rare earth sintered magnets which contains R which is a rare earth element; T which is a transition metal essentially containing Fe; a metallic element M containing one or more metals selected from Al, Ga and Cu; B and inevitable impurities, in which R accounts for 13 at % to 15 at %, B accounts for 4.5 at % to 6.2 at %, M accounts for 0.1 at % to 2.4 at %, T accounts for balance, a proportion of Dy in all rare earth elements is in a range of 0 at % to 65 at %, and the following Formula 1 is satisfied, (Continued)

$$0.0049\text{Dy}+0.34 \leq \text{B/TRE} \leq 0.0049\text{Dy}+0.36 \quad \text{Formula 1}$$

wherein Dy represents a concentration (at %) of a Dy element, B represents a concentration (at %) of a boron element, and TRE represents a concentration (at %) of all the rare earth elements.

6 Claims, 13 Drawing Sheets

(30) Foreign Application Priority Data

Mar. 16, 2012 (JP) .............................. JP2012-060259
Jul. 3, 2012 (JP) .............................. JP2012-149560

(51) Int. Cl.

| | | |
|---|---|---|
| B22F 3/24 | (2006.01) | |
| H01F 41/02 | (2006.01) | |
| H01F 1/053 | (2006.01) | |
| C22C 33/02 | (2006.01) | |
| C22C 38/00 | (2006.01) | |
| C22C 38/02 | (2006.01) | |
| C22C 38/06 | (2006.01) | |
| C22C 38/16 | (2006.01) | |
| C22C 38/10 | (2006.01) | |
| C21D 6/00 | (2006.01) | |
| H01F 1/01 | (2006.01) | |
| B22F 3/16 | (2006.01) | |
| H02K 1/02 | (2006.01) | |
| H01F 1/058 | (2006.01) | |

(52) U.S. Cl.
CPC ........ *C22C 33/0278* (2013.01); *C22C 38/002* (2013.01); *C22C 38/005* (2013.01); *C22C 38/02* (2013.01); *C22C 38/06* (2013.01); *C22C 38/10* (2013.01); *C22C 38/16* (2013.01); *H01F 1/01* (2013.01); *H01F 1/0577* (2013.01); *H01F 41/0293* (2013.01); *H02K 1/02* (2013.01); *B22F 2003/248* (2013.01); *H01F 1/058* (2013.01)

(56) References Cited

U.S. PATENT DOCUMENTS

| | | | |
|---|---|---|---|
| 6,447,621 B1 | 9/2002 | Tokoro et al. | |
| 7,090,730 B2* | 8/2006 | Nomura | H01F 1/0577 148/302 |
| 9,558,872 B2* | 1/2017 | Yamazaki | H01F 1/0571 |
| 2004/0094237 A1 | 5/2004 | Nomura et al. | |
| 2005/0067058 A1* | 3/2005 | Fujimori | C22C 38/005 148/302 |
| 2005/0183791 A1 | 8/2005 | Hidaka et al. | |
| 2005/0268989 A1* | 12/2005 | Tomizawa | C22C 1/0441 148/105 |
| 2007/0095438 A1 | 5/2007 | Sasaki et al. | |
| 2007/0102069 A1* | 5/2007 | Hidaka | C22C 38/005 148/302 |
| 2007/0240790 A1 | 10/2007 | Kita et al. | |
| 2009/0072938 A1 | 3/2009 | Nakajima et al. | |
| 2010/0282371 A1* | 11/2010 | Sagawa | H01F 1/0557 148/302 |
| 2011/0025440 A1 | 2/2011 | Kuniyoshi et al. | |
| 2011/0095855 A1* | 4/2011 | Kuniyoshi | H01F 1/0577 335/302 |
| 2012/0091844 A1* | 4/2012 | Nakajima | C22C 38/005 310/152 |
| 2014/0191831 A1 | 7/2014 | Yamazaki et al. | |
| 2016/0012946 A1 | 1/2016 | Horikita et al. | |
| 2016/0268024 A1 | 9/2016 | Yamazaki et al. | |
| 2016/0284452 A1 | 9/2016 | Horikita et al. | |

FOREIGN PATENT DOCUMENTS

| | | | |
|---|---|---|---|
| CN | 102568809 A | 7/2012 | |
| EP | 0249973 A1 | 12/1987 | |
| EP | 1 033 415 A1 | 9/2000 | |
| EP | 1 662 516 A1 | 5/2006 | |
| JP | 62-222019 A | 9/1987 | |
| JP | 63-266021 A | 11/1988 | |
| JP | 03-153006 A | 7/1991 | |
| JP | 04-011703 A | 1/1992 | |
| JP | 04-206805 A | 7/1992 | |
| JP | 05-112852 A | 5/1993 | |
| JP | 05315120 A * | 11/1993 | ........... H01F 1/0577 |
| JP | 06260316 A * | 9/1994 | ........... H01F 1/0577 |
| JP | 06-302419 A | 10/1994 | |
| JP | 06302419 A * | 10/1994 | ........... H01F 1/0576 |
| JP | 07-283016 A | 10/1995 | |
| JP | 2004-165482 A | 6/2004 | |
| JP | 2006-265609 A | 10/2006 | |
| JP | 2007-119882 A | 5/2007 | |
| JP | 2007-277655 A | 10/2007 | |
| JP | 2007-305878 A | 11/2007 | |
| JP | 2009-231391 A | 10/2009 | |
| JP | 2011-021269 A | 2/2011 | |
| JP | 2012-79726 A | 4/2012 | |
| WO | 2010/113371 A1 | 7/2010 | |
| WO | WO-2010113371 A1 * | 10/2010 | ........... C22C 38/005 |

OTHER PUBLICATIONS

Machine translation of JP05-315120A. Nov. 1993. (Year: 1993).*
Machine translation of JP06-260316A. (Year: 1994).*
International Search Report of PCT/JP2012/067367 dated Sep. 25, 2012.
Masato Sagawa, "Permanent Magnet-Material Science and Application", First Edition Second Impression published on Nov. 30, 2008, pp. 256-261.
Notice of Allowance dated Jun. 3, 2014, issued by the Japanese Patent Office in corresponding Application No. 2012-149560.
Machine Translation of JP1994-302419A. Oct. 1994.
Fu Shi "Preparation Technology of Rare Earth Permanent" Magnetic Materials, Jan. 2007 (6 pages total).
Communication dated Feb. 3, 2017, from the State Intellectual Property Office of People's Republic of China in counterpart Application No. 201510379002.0.
Office Action dated Aug. 21, 2017, which issued during the prosecution of U.S. Appl. No. 14/126,770.
Office Action dated Dec. 1, 2017, which issued during the prosecution of U.S. Appl. No. 14/126,770.
An Office Action dated Apr. 20, 2017, which issued during the prosecution of U.S. Appl. No. 14/126,770.
Communication dated Jul. 7, 2017, issued by the German Patent and Trademark Office in counterpart application No. 112012002150.9.
An Office Action dated Apr. 5, 2018, which issued during the prosecution of U.S. Appl. No. 14/126,770.
Notice of Allowance dated Sep. 15, 2016 issued by the United States Patent and Trademark Office issued during the prosecution of U.S. Appl. No. 14/146,098.
Communication dated Dec. 17, 2015, issued by the State Intellectual Property Office of the P.R.C. in Chinese Application No. 201410001076.6.
Masato Sagawa, "All about Neodymium Magnet—Let's Protect Earth with Rare Earth", First Print of the First Edition, Apr. 30, 2011, pp. 104-105 (5 pages total).
Communication dated Nov. 17, 2017, from the European Patent Office in counterpart European Application No. 13006066.8.

* cited by examiner

ALLOY FOR R-T-B-BASED RARE EARTH SINTERED MAGNET, PROCESS OF PRODUCING ALLOY FOR R-T-B-BASED RARE EARTH SINTERED MAGNET, ALLOY MATERIAL FOR R-T-B-BASED RARE EARTH SINTERED MAGNET, R-T-B-BASED RARE EARTH SINTERED MAGNET, PROCESS OF PRODUCING R-T-B-BASED RARE EARTH SINTERED MAGNET, AND MOTOR

CROSS-REFERENCE TO RELATED APPLICATIONS

This is a Rule 53(b) Application of U.S. application Ser. No. 14/126,770 filed Dec. 16, 2013, which is a National Stage of International Application No. PCT/JP2012/067367 filed Jul. 6, 2012, which claims benefit of Japanese Patent Application Nos. 2011-151815 filed Jul. 8, 2011, 2011-229289 filed Oct. 18, 2011, 2012-060259 filed Mar. 16, 2012, and 2012-149560 filed Jul. 3, 2012, the contents of all of which are incorporated herein by reference in their entirety.

The present invention relates to an alloy for R-T-B-based rare earth sintered magnets, a process of producing the alloy for R-T-B-based rare earth sintered magnets, an alloy material for R-T-B-based rare earth sintered magnets, an R-T-B-based rare earth sintered magnet, a process of producing the R-T-B-based rare earth sintered magnet, and a motor, and particularly to an alloy for R-T-B-based rare earth sintered magnets and an alloy material for R-T-B-based rare earth sintered magnets which have excellent magnetic properties and from which R-T-B-based rare earth sintered magnets that are preferably used for motors can be obtained.

BACKGROUND ART

Hitherto, R-T-B-based rare earth sintered magnets (hereinafter, sometimes referred to as "R-T-B-based magnets") have been used in motors such as voice coil motors in hard disc drives and motors for engines in hybrid vehicles or electrical vehicles.

R-T-B-based magnets can be obtained by molding and sintering R-T-B-based alloy powder primarily containing Nd, Fe and B. Generally, in R-T-B-based alloys, R refers to Nd or a substance containing Nd and other rare earth elements such as Pr, Dy and Tb that substitute some of Nd. T refers to Fe or a substance containing Fe and other transition elements such as Co and Ni that substitute some of Fe. B refers to boron, and some of B can be substituted by C or N.

The structure of an ordinary R-T-B-based magnet is mainly made up of a main phase made of $R_2T_{14}B$ and an R-rich phase that is present in the grain boundary of the main phase and has a higher concentration of Nd than the main phase. The R-rich phase is also called a grain boundary phase.

In addition, generally, the composition of an R-T-B-based alloy is set so that Nd, Fe and B are in a ratio as close to $R_2T_{14}B$ as possible in order to increase the proportion of the main phase in the structure of the R-T-B-based magnet (for example, refer to NPL 1).

In addition, there are cases in which R-T-B-based alloys include an $R_2T_{17}$ phase. The $R_2T_{17}$ phase is known as a cause of the degradation of the coercive force or squareness of an R-T-B-based magnet (for example, refer to PTL 1). Therefore, in a case in which the $R_2T_{17}$ phase is present in an R-T-B-based alloy, the $R_2T_{17}$ phase is removed in a sintering step of producing an R-T-B-based magnet.

In addition, since R-T-B-based magnets used in automobile motors are exposed to a high temperature in the motors, a large coercive force (Hcj) is required.

As a technique to improve the coercive forces of R-T-B-based magnets, there is a technique that substitutes Nd as R in an R-T-B-based alloy with Dy. However, Dy has biased resources and is thus produced only in a limited amount, and therefore it becomes difficult to stably supply Dy. As a result, studies are being made regarding techniques to improve the coercive force of an R-T-B-based magnet without increasing the amount of Dy contained in an R-T-B-based alloy.

In order to improve the coercive force (Hcj) of an R-T-B-based magnet, there is a technique that adds metal elements such as Al, Si, Ga and Sn (for example, refer to PTL 2). In addition, it is known that Al and Si are incorporated into an R-T-B-based magnet as inevitable impurities as described in PTL 2. In addition, it is known that, when the amount of Si contained in an R-T-B-based alloy as an impurity exceeds 5%, the coercive force of an R-T-B-based magnet decreases (for example, refer to PTL 3).

PATENT LITERATURE

[PTL 1] Japanese Unexamined Patent Application, First Publication No. 2007-119882
[PTL 2] Japanese Unexamined Patent Application, First Publication No. 2009-231391
[PTL 3] Japanese Unexamined Patent Application, First Publication No. H5-112852

NON-PATENT LITERATURE

[NPL 1] Permanent Magnet-Material Science and Application by Masato Sagawa, First Edition Second Impression published on Nov. 30, 2008, pp. 256 to 261

SUMMARY OF INVENTION

However, in the related art, there were cases in which it was not possible to obtain an R-T-B-based magnet having a sufficiently large coercive force (Hcj) even when metal elements such as Al, Si, Ga and Sn were added to an R-T-B-based alloy. As a result, it was necessary to increase the concentration of Dy even when the metallic elements were added. Therefore, there was a demand for the supply of an R-T-B-based alloy from which R-T-B-based magnets having a large coercive force could be obtained without increasing the amount of Dy contained in the R-T-B-based alloy.

The invention has been made in consideration of the above circumference, and an object of the invention is to provide an alloy for R-T-B-based rare earth sintered magnets from which R-T-B-based magnets having a large coercive force can be obtained without increasing the amount of Dy contained in the R-T-B-based alloy, an alloy material for R-T-B-based rare earth sintered magnets, an R-T-B-based rare earth sintered magnet for which the alloy material for R-T-B-based rare earth sintered magnets is used, and a process of producing the same.

In addition, another object of the invention is to provide a motor for which the R-T-B-based rare earth sintered magnet is used.

The present inventors repeated thorough studies to solve the above problem.

As a result, it was found that, when an R-T-B-based magnet includes a main phase primarily containing $R_2Fe_{14}B$ and a grain boundary containing more R than the main phase, and the grain boundary phase includes a grain boundary phase (R-rich phase) having a high concentration of rare earth elements which has been thus far known and a grain boundary phase (transition metal-rich phase) having a lower concentration of rare earth elements and a higher concentration of transition metal elements than a grain boundary phase of the related art, it is possible to obtain an R-T-B-based magnet having a large coercive force. Furthermore, it was found that, as the volume ratio of the transition metal-rich phase included in the R-T-B-based magnet increases, the coercive force improves.

In addition, the inventors studied the compositions of an R-T-B-based alloy as described below in order to develop the effect of the inclusion of Dy that improves the coercive force in an R-T-B-based magnet including the transition metal-rich phase.

That is, the transition metal-rich phase has a lower concentration of all atoms of rare earth elements and a higher concentration of Fe atoms than other grain boundary phases. Therefore, studies have been conducted for ways to increase the concentration of Fe or to decrease the concentration of B.

As a result, it was found that the coercive force reached the maximum at a specific concentration of B. Furthermore, it was found that the optimal concentration of B differs depending on the concentration of Dy.

(1) An alloy for R-T-B-based rare earth sintered magnets containing R which is a rare earth element; T which is a transition metal essentially containing Fe; a metallic element M containing one or more metals selected from Al, Ga and Cu; B and inevitable impurities, in which R accounts for 13 at % to 15 at %, B accounts for 4.5 at % to 6.2 at %, M accounts for 0.1 at % to 2.4 at %, T accounts for balance, a proportion of Dy in all rare earth elements is in a range of 0 at % to 65 at %, and the following Formula 1 is satisfied.

$$0.0049Dy+0.34 \leq B/TRE \leq 0.0049Dy+0.36 \quad \text{Formula 1}$$

In Formula 1, Dy represents the concentration (at %) of a Dy element, B represents the concentration (at %) of a boron element, and TRE represents the concentration (at %) of all the rare earth elements.

(2) The alloy for R-T-B-based rare earth sintered magnets according to (1) containing 0.7 at % to 1.4 at % of the M.

(3) The alloy for R-T-B-based rare earth sintered magnets according to (1) or (2) further containing Si.

(4) The alloy for R-T-B-based rare earth sintered magnets according to any one of (1) to (3), in which an area ratio of a region including an $R_2T_{17}$ phase is in a range of 0.1% to 50%.

(5) An alloy material for R-T-B-based rare earth sintered magnets including an R-T-B-based alloy containing R which is a rare earth element; T which is a transition metal essentially containing Fe; B and inevitable impurities, in which R accounts for 13 at % to 15 at %, B accounts for 4.5 at % to 6.2 at %, T accounts for balance, a proportion of Dy in all rare earth elements is in a range of 0 at % to 65 at %, and the following Formula 1 is satisfied; and an additional metal made of a metallic elements M comprising one or more metals selected from Al, Ga and Cu or an alloy containing the metallic element M, in which the alloy material for R-T-B-based rare earth sintered magnets contains the metallic element M in a range of 0.1 at % to 2.4 at %, $$0.0049Dy+0.34 \leq B/TRE \leq 0.0049Dy+0.36 \quad \text{Formula 1}$$

In Formula 1, Dy represents the concentration (at %) of a Dy element, B represents the concentration (at %) of a boron element, and TRE represents the concentration (at %) of all the rare earth elements.

(6) An alloy material for R-T-B-based rare earth sintered magnets including an R-T-B-based alloy containing R which is a rare earth element; T which is a transition metal essentially containing Fe; a first metal comprising one or more metals selected from Al, Ga and Cu; B and inevitable impurities, in which R accounts for 13 at % to 15 at %, B accounts for 4.5 at % to 6.2 at %, T accounts for balance, a proportion of Dy in all rare earth elements is 0 at % to 65 at %, and the following Formula 1 is satisfied; and an additional metal made of a second metal comprising one or more metals selected from Al, Ga and Cu or an alloy containing the second metal, in which the alloy material for R-T-B-based rare earth sintered magnets contains the first metal and the second metal in a range of 0.1 at % to 2.4 at % in total, $$0.0049Dy+0.34 \leq B/TRE \leq 0.0049Dy+0.36 \quad \text{Formula 1}$$

In Formula 1, Dy represents a concentration (at %) of a Dy element, B represents a concentration (at %) of a boron element, and TRE represents the concentration (at %) of all the rare earth elements.

(7) The alloy material for R-T-B-based rare earth sintered magnets according to (5) or (6) further containing Si.

(8) The alloy material for R-T-B-based rare earth sintered magnets according to (7), in which a amount of Si in the alloy material for R-T-B-based rare earth sintered magnets is in a range of 0.7 at % to 1.5 at %.

(9) The alloy material for R-T-B-based rare earth sintered magnets according to any one of (5) to (8), in which an area ratio of a region including an $R_2T_{17}$ phase in the R-T-B-based alloy is in a range of 0.1% to 50%.

(10) A process of producing R-T-B-based rare earth sintered magnets, in which the alloy for R-T-B-based rare earth sintered magnets according to any one of (1) to (4) or the alloy material for R-T-B-based rare earth sintered magnets according to any one of (5) to (9) is molded and sintered.

(11) The process of producing R-T-B-based rare earth sintered magnets according to (10), in which the sintering is carried out in a range of 800° C. to 1200° C., and then a thermal treatment is carried out in a range of 400° C. to 800° C.

(12) The process of producing R-T-B-based rare earth sintered magnets according to (10) or (11), in which a diffusion step of attaching Dy metal or Tb metal, or a Dy compound or a Tb compound to a surface of a sintered R-T-B-based magnet and of carrying out a thermal treatment is carried out.

(13) An R-T-B-based rare earth sintered magnet containing R which is a rare earth element; T which is a transition metal essentially containing Fe; a metallic element M containing one or more metals selected from Al, Ga and Cu; B and inevitable impurities, in which R accounts for 13 at % to 15 at %, B accounts for 4.5 at % to 6.2 at %, M accounts for 0.1 at % to 2.4 at %, T accounts for balance, a proportion of Dy in all rare earth elements is in a range of 0 at % to 65 at %, the following Formula 1 is satisfied, wherein the R-T-B-based rare earth sintered magnet is made of a sintered body including a main phase primarily containing $R_2Fe_{14}B$ and a grain boundary containing more R than the main phase, in which the grain boundary phase includes a phase having a concentration of all atoms of the rare earth elements of 70 at % or more and a phase having a concentration of all the atoms of the rare earth elements in a range of 25 at % to 35 at %, $$0.0049Dy+0.34 \leq B/TRE \leq 0.0049Dy+0.36 \quad \text{Formula 1}$$

In Formula 1, Dy represents a concentration (at %) of a Dy element, B represents a concentration (at %) of a boron element, and TRE represents the concentration (at %) of all the rare earth elements.

(14) The R-T-B-based rare earth sintered magnet according to (13) further containing Si.

(15) The R-T-B-based rare earth sintered magnet according to (13) or (14), in which the volume ratio of the phase having a concentration of all the atoms of the rare earth elements in a range of 25 at % to 35 at % is in a range of 0.005 vol. % to 3 vol. %.

(16) The R-T-B-based rare earth sintered magnet according to any one of (13) to (15), in which a concentration of Dy or Tb on a surface of the sintered magnet is higher than a concentration of Dy or Tb in the sintered magnet.

(17) A motor including the R-T-B-based rare earth sintered magnet according to any one of (13) to (16).

(18) An alloy for R-T-B-based rare earth sintered magnets containing R which is a rare earth element; T which is a transition metal essentially containing Fe; a metallic element M containing one or more metals selected from Al, Ga and Cu; B and inevitable impurities, in which R accounts for 13 at % to 15 at %, B accounts for 5.0 at % to 6.0 at %, M accounts for 0.1 at % to 2.4 at %, T accounts for balance, a proportion of Dy in all rare earth elements is in a range of 0 at % to 65 at %, and wherein the alloy for R-T-B-based rare earth sintered magnets includes a main phase primarily containing $R_2Fe_{14}B$ and an alloy grain boundary phase containing more R than the main phase, and an interval between the alloy grain boundary phases is 3 μm or less.

(19) The alloy for R-T-B-based rare earth sintered magnets according to (18) further containing Si.

(20) The alloy for R-T-B-based rare earth sintered magnets according to (18) or (19), in which a ratio (Fe/B) of an amount of Fe to an amount of B is in a range of 13 to 16.

(21) The alloy for R-T-B-based rare earth sintered magnets according to any one of (18) to (20), in which B/TRE (B represents a concentration (at %) of a boron element, and TRE represents a concentration (at %) of all the rare earth elements) is in a range of 0.355 to 0.38.

(22) A process of producing alloys for R-T-B-based rare earth sintered magnets including a casting step of casting a molten alloy containing R which is a rare earth element; T which is a transition metal essentially containing Fe; a metallic element M containing one or more metals selected from Al, Ga and Cu; B and inevitable impurities, in which R accounts for 13 at % to 15 at %, B accounts for 5.0 at % to 6.0 at %, M accounts for 0.1 at % to 2.4 at %, T accounts for balance, and a proportion of Dy in all rare earth elements is in a range of 0 at % to 65 at % using a strip casting method in which a workpiece is cooled using a cooling roll, in which, in the casting step, a temperature-holding step of maintaining a cast alloy at a certain temperature for 10 seconds to 120 seconds while a temperature of the cast alloy decreases from more than 800° C. to lower than 500° C. is carried out.

(23) The process of producing alloys for R-T-B-based rare earth sintered magnets according to (22), in which the molten alloy contains Si.

(24) The process of producing alloys for R-T-B-based rare earth sintered magnets according to (22) or (23), in which at least a part of the casting step is carried out in an atmosphere containing helium.

Further, in the present specification, in order to differentiate the grain boundary phase of the alloy for R-T-B-based rare earth sintered magnets and the grain boundary phase of the R-T-B-based rare earth sintered magnet, the grain boundary phase of the alloy for magnets will be called the alloy grain boundary phase.

Since the alloy material for R-T-B-based rare earth permanent magnets of the invention has a amount of B that satisfies the above (formula 1) and contains 0.1 at % to 2.4 at % of the metallic element, it is possible to sufficiently ensure the volume ratio of the transition metal-rich phase in an R-T-B-based rare earth permanent magnet formed by molding and sintering the alloy material, and the R-T-B-based rare earth permanent magnet of the invention having a large coercive force can be obtained while suppressing the amount of Dy.

In addition, since the R-T-B-based rare earth sintered magnet of the invention has a large coercive force, the R-T-B-based rare earth sintered magnet can be preferably used for motors and the like.

In a case in which the alloy for R-T-B-based rare earth permanent magnets of the invention contains R which is a rare earth element; T which is a transition metal essentially containing Fe; a metallic element M containing one or more metals selected from Al, Ga and Cu; B and inevitable impurities, in which R accounts for 13 at % to 15 at %, B accounts for 5.0 at % to 6.0 at %, M accounts for 0.1 at % to 2.4 at %, T accounts for balance, and the proportion of Dy in all the rare earth elements is in a range of 0 at % to 65 at %, the main phase primarily containing $R_2Fe_{14}B$ and the alloy grain boundary phase containing more R than the main phase are included, and the interval between the alloy grain boundary phases is 3 μm or less, when the alloy is finely ground to 3 μm or less, since the alloy grain boundary has a shape of being attached to the circumferences of powder, the alloy grain boundary phase is uniformly distributed among powder, and the grain boundary phase is also uniformly distributed in a sintered body, and therefore the R-T-B-based rare earth permanent magnet of the invention having a large coercive force can be obtained. As a result, the amount of Dy can be suppressed.

Since the process of producing alloys for R-T-B-based rare earth sintered magnets of the invention is a process in which the temperature-holding step of maintaining the cast alloy at a certain temperature for 10 seconds to 120 seconds while the temperature of the cast alloy decreases from more than 800° C. to lower than 500° C. is carried out in the casting step, it is possible to sufficiently ensure the volume ratio of the transition metal-rich phase in an R-T-B-based rare earth permanent magnet formed by molding and sintering the obtained R-T-B-based alloy, and an R-T-B-based rare earth permanent magnet having a large coercive force can be obtained while suppressing the amount of Dy.

BRIEF DESCRIPTION OF DRAWINGS

FIG. 15A illustrates the temperatures against the elapsed times in a range of 0 seconds to 1 second, FIG. 15B illustrates the temperatures against the elapsed times in a range of 0 seconds to 250 seconds, and FIG. 15C illustrates the temperatures against the elapsed times in a range of 0 seconds to 700 seconds.

DESCRIPTION OF EMBODIMENTS

Figure 1:
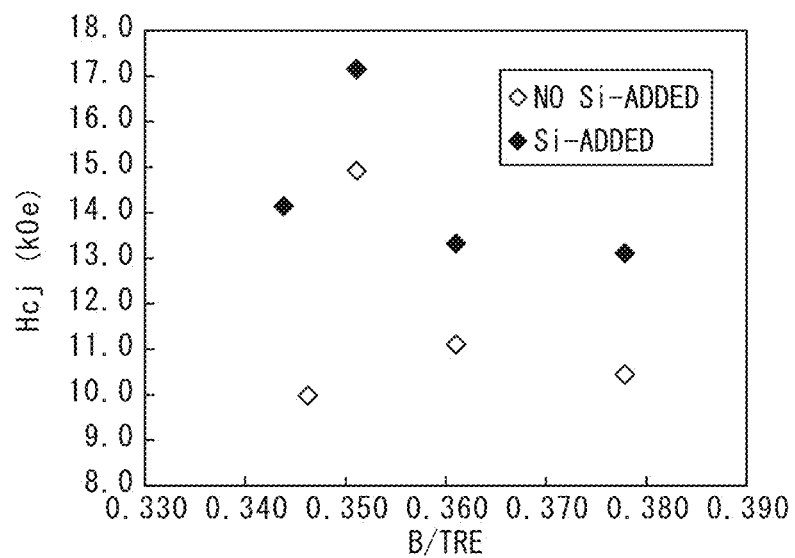
FIG. 1 is a view in which a relationship between B/TRE (B represents a concentration (at %) of a boron element, and TRE represents a concentration (at %) of all the rare earth elements) and Hcj (coercive force) of a sintered magnet manufactured using an alloy having Dy=0 at % is plotted.

Hereinafter, embodiments of the invention will be described in detail.

First Embodiment

"Alloy for R-T-B-Based Rare Earth Sintered Magnets"

An alloy for R-T-B-based rare earth sintered magnets of the present embodiment (hereinafter abbreviated to "R-T-B-based alloy") is an alloy used to produce an R-T-B-based rare earth sintered magnet (hereinafter abbreviated to "R-T-B-based magnet") of the invention formed by molding and sintering a sintered body including a main phase primarily containing $R_2Fe_{14}B$ and a grain boundary phase containing more R than the main phase, in which the grain boundary phase includes an R-rich phase and a transition metal-rich phase that is a grain boundary phase having a lower concentration of rare earth elements and a higher concentration of transition metal elements than the R-rich phase.

In the embodiment, the R-rich phase is a phase in which the concentration of all atoms of R which is rare earth elements is 70 at % or more. The transition metal-rich phase is a phase in which the concentration of all atoms of the rare earth element R is in a range of 25 at % to 35 at %. The transition metal-rich phase preferably contains 50 at % to 70 at % of T which is a transition metal essentially containing Fe.

The R-T-B-based alloy of the embodiment is an R-T-B-based alloy containing R which is a rare earth element, T which is a transition metal essentially containing Fe, a metallic element M containing one or more metals selected from Al, Ga and Cu, B and inevitable impurities, in which R accounts for 13 at % to 15 at %, B accounts for 4.5 at % to 6.2 at %, M accounts for 0.1 at % to 2.4 at %, T accounts for balance, and the following Formula 1 is satisfied. In addition, the R-T-B-based alloy of the embodiment is an alloy in which the proportion of Dy in all rare earth elements is in a range of 0 at % to 65 at %.

$$0.0049Dy+0.34 \leq B/TRE \leq 0.0049Dy+0.36 \quad \text{Formula 1}$$

In Formula 1, Dy represents a concentration (at %) of a Dy element, B represents a concentration (at %) of a boron element, and TRE represents a concentration (at %) of all the rare earth elements.

When the amount of R contained in the R-T-B-based alloy is less than 13 at %, the coercive force of an R-T-B-based magnet obtained using the alloy becomes insufficient. In addition, when the amount of R exceeds 15 at %, the remanence of an R-T-B-based magnet obtained using the alloy becomes low, and the magnet becomes unsuitable for magnets.

The amount of Dy in all the rare earth elements in the R-T-B-based alloy is set in a range of 0 at % to 65 at %. In the embodiment, since the inclusion of the transition metal-rich phase improves the coercive force, the R-T-B-based alloy may not contain Dy, and even in a case in which the R-T-B-based alloy contains Dy, a large effect that improves the coercive force can be sufficiently obtained at an amount of 65 at % or less.

Examples of rare earth elements other than Dy in the R-T-B-based alloy include Sc, Y, La, Ce, Pr, Nd, Pm, Sm, Eu, Gd, Tb, Ho, Er, Tm, Yb and Lu, and, among the above, Nd, Pr and Tb are particularly preferable. In addition, R in the R-T-B-based alloy preferably contains Nd as a main component.

In addition, B contained in the R-T-B-based alloy is boron, and some of B can be substituted by C or N. The amount of B is in a range of 4.5 at % to 6.2 at %, and satisfies the above Formula 1. The amount of B is more preferably in a range of 4.8 at % to 5.5 at %. When the amount of B contained in the R-T-B-based alloy is less than 4.5 at %, the coercive force of an R-T-B-based magnet obtained using the alloy becomes insufficient. When the amount of B is beyond the range of the above Formula 1, the generation amount of the transition metal-rich phase becomes insufficient, and the coercive force does not sufficiently improve.

The R-T-B-based alloy of the embodiment includes a main phase primarily containing $R_2Fe_{14}B$ and an alloy grain boundary phase containing more R than the main phase. The alloy grain boundary phase can be observed using a back-scattered electron image of an electronic microscope. The alloy grain boundary phase may contain, substantially, only R or contain R-T-M.

In the R-T-B-based alloy of the embodiment, in order to set the interval between the alloy grain boundary phases to 3 μm or less, the amount of B contained in the R-T-B-based alloy is set in a range of 5.0 at % to 6.0 at %. When the amount of B is set in the above range, the grain diameter of an alloy structure decreases so that grindability improves, and the grain boundary phase is uniformly distributed in an R-T-B-based magnet produced using the alloy so as to obtain an excellent coercive force. In order to obtain a fine alloy structure having superior grindability and an interval between the alloy grain boundary phases of 3 μm or less, the amount of B is preferably set to 5.5 at % or less. However, in a case in which the amount of B contained in the R-T-B-based alloy is less than 5.0 at %, the interval between adjacent alloy grain boundary phases in the R-T-B-based alloy abruptly increases, and it becomes difficult to obtain a fine alloy structure having an interval between the alloy grain boundary phases of 3 μm or less. In addition, as the amount of B contained in the R-T-B-based alloy increases, the interval between adjacent alloy grain boundary phases in the R-T-B-based alloy abruptly increases, and alloy grains become large. In addition, when the amount of B becomes excessive, a B-rich phase is included in a sintered magnet. Therefore, in a case in which the amount of B exceeds 6.0 at %, there is a concern that the coercive force of an R-T-B-based magnet produced using the alloy may become insufficient.

In addition, in order to decrease the grain diameter of the alloy structure so as to improve the coercive force of an R-T-B-based magnet produced using the alloy, the ratio (Fe/B) of the amount of Fe to the amount of B contained in the R-T-B-based alloy is preferably in a range of 13 to 16. In addition, in a case in which Fe/B is in a range of 13 to 16, the generation of the transition metal-rich phase is effectively accelerated in a step of producing R-T-B-based alloys and/or a step of producing R-T-B-based magnets. However, when Fe/B exceeds 16, the interval between adjacent alloy grain boundary phases in the R-T-B-based alloy abruptly increases, and it becomes difficult to obtain a fine alloy structure having an interval between the alloy grain boundary phases of 3 μm or less.

In addition, when Fe/B becomes less than 13, as Fe/B decreases, the interval between adjacent alloy grain boundary phases in the R-T-B-based alloy increases, and alloy grains become large. Therefore, in a case in which Fe/B is less than 13, there is a concern that the coercive force of an R-T-B-based magnet produced using the alloy may become insufficient.

In addition, in order to decrease the grain diameter of the alloy structure so as to improve the coercive force of an R-T-B-based magnet produced using the alloy, B/TRE is preferably set in a range of 0.355 to 0.38. B/TRE is more preferably 0.36 or less so as to obtain a fine alloy structure having superior grindability and an interval between the alloy grain boundary phases of 3 μm or less. In a case in which B/TRE is less than 0.355, the interval between adjacent alloy grain boundary phases in the R-T-B-based alloy abruptly increases, and it becomes difficult to obtain a fine alloy structure having an interval between the alloy grain boundary phases of 3 μm or less. In addition, as B/TRE increases, the interval between adjacent alloy grain boundary phases in the R-T-B-based alloy increases, and alloy grains become large. Therefore, in a case in which B/TRE exceeds 0.38, there is a concern that the coercive force of an R-T-B-based magnet produced using the alloy may become insufficient.

In addition, T contained in the R-T-B-based alloy is a transition metal essentially containing Fe. As transition metals other than Fe contained in T of the R-T-B-based alloy, a variety of elements belonging to Groups 3 to 11 can be used. In a case in which the R-T-B-based alloy contains Co in addition to Fe, the curie temperature (Tc) can be improved, which is preferable.

FIG. 1 is a view in which the relationship between B/TRE (B represents a concentration (at %) of a boron element, and TRE represents a concentration (at %) of all the rare earth elements) and Hcj (coercive force) of a sintered magnet manufactured using an alloy having Dy=0 at % is plotted. In FIG. 1, the coercive force reaches the maximum when B/TRE=0.35.

Figure 2:
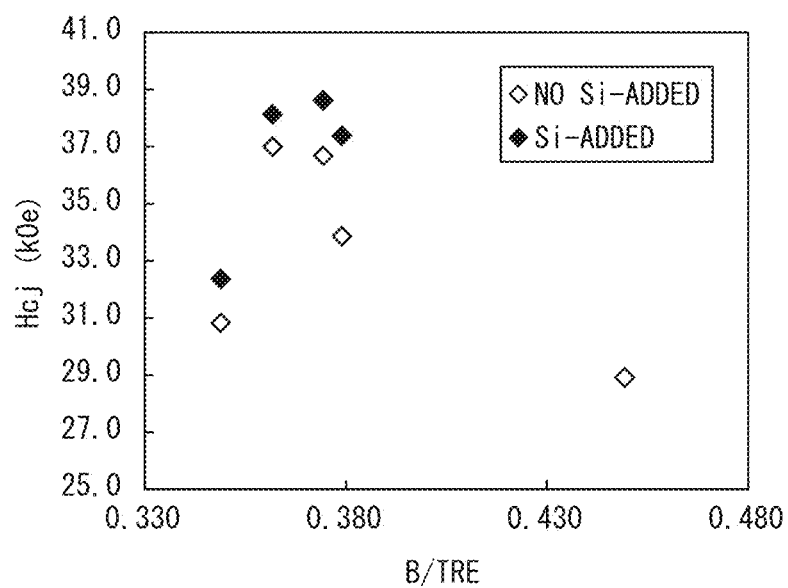
FIG. 2 is a view in which the relationship between B/TRE (B represents a concentration (at %) of a boron element, and TRE represents a concentration (at %) of all the rare earth elements) and Hcj (coercive force) of a sintered magnet manufactured using an alloy having Dy≈3.8 at % is plotted.

FIG. 2 is a view in which the relationship between B/TRE (B represents a concentration (at %) of a boron element, and TRE represents a concentration (at %) of all the rare earth elements) and Hcj (coercive force) of a sintered magnet manufactured using an alloy having Dy≈3.8 at % is plotted. In FIG. 2, the coercive force reaches the maximum when B/TRE=0.37.

Figure 3:
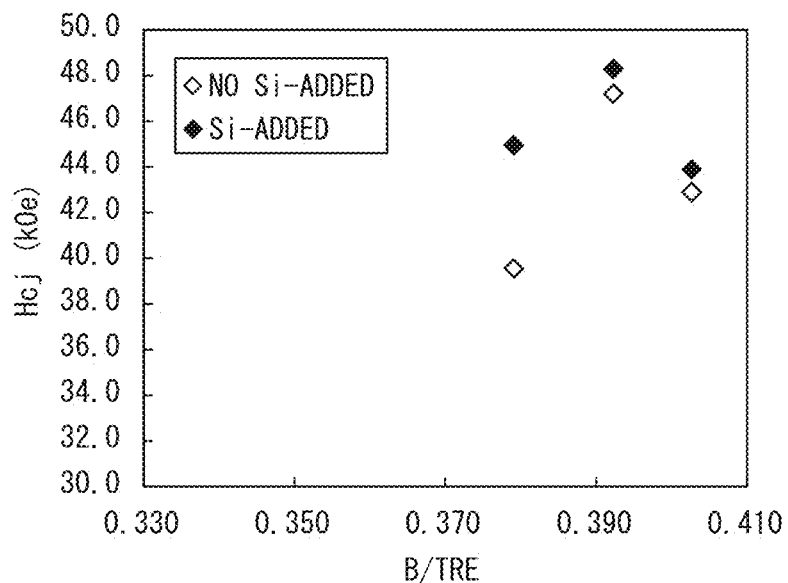
FIG. 3 is a view in which the relationship between B/TRE (B represents a concentration (at %) of a boron element, and TRE represents a concentration (at %) of all the rare earth elements) and Hcj (coercive force) of a sintered magnet manufactured using an alloy having Dy≈4.3 at % is plotted.

FIG. 3 is a view in which the relationship between B/TRE (B represents a concentration (at %) of a boron element, and TRE represents a concentration (at %) of all the rare earth elements) and Hcj (coercive force) of a sintered magnet manufactured using an alloy having Dy≈4.2 at % is plotted. In FIG. 3, the coercive force reaches the maximum when B/TRE=0.39.

Figure 4:
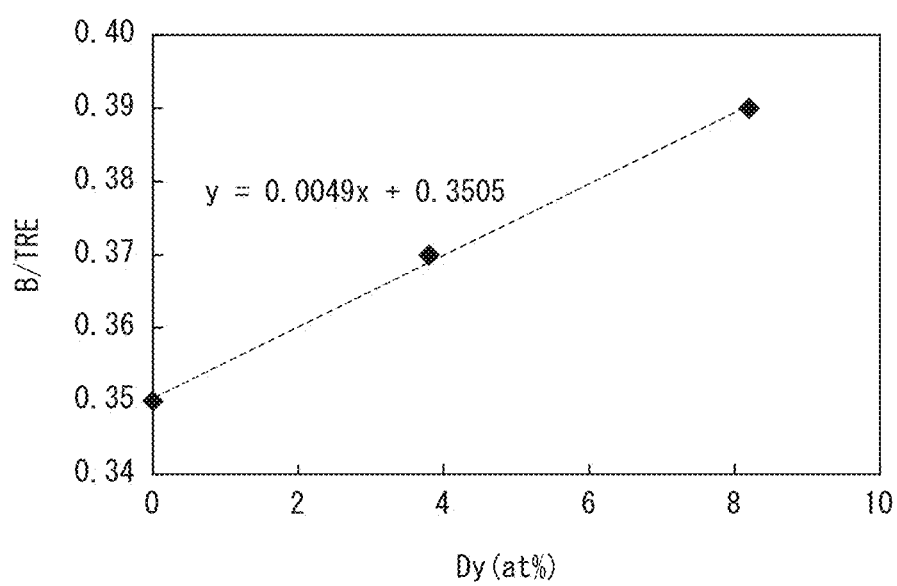
FIG. 4 is a view in which the relationship between a concentration of Dy and B/TRE (B represents a concentration (at %) of a boron element, and TRE represents a concentration (at %) of all the rare earth elements) at a point at which the coercive force reaches the maximum is plotted.

When the relationship between the concentration of Dy and B/TRE at a point at which the coercive force reaches the maximum is plotted, the relationship becomes as illustrated in FIG. 4. From the straight line in FIG. 4, the following formula is derived.

$$B/TRE=0.0049Dy+0.35 \quad \text{Formula 2}$$

From FIGS. 2 and 3, it is found that the width of B/TRE in which the coercive force decreases from the maximum to less than 90% of the maximum value is outside a range of B/TRE at which the coercive force reaches the maximum±0.01. That is, in a range of the above (Formula 2)−0.01 to the above (Formula 2)+0.01, a coercive force that is equal to or larger than 90% of the maximum coercive force can be obtained. With an assumption that the above range is an appropriate B/TRE, the appropriate range of B/TRE is represented by the following Formula 1.

$$0.0049Dy+0.34 \leq B/TRE \leq 0.0049Dy+0.36 \quad \text{Formula 1}$$

Figure 5:
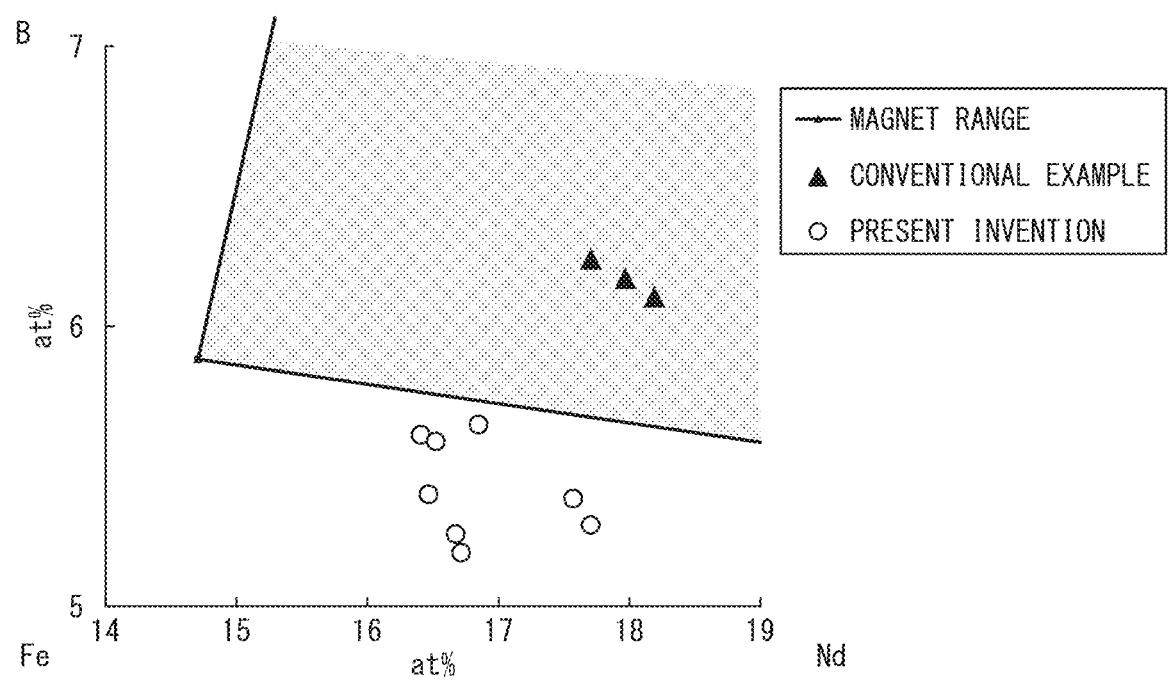
FIG. 5 is an R-T-B ternary phase diagram.

An alloy that satisfies the above Formula 1 has a higher concentration of Fe and a lower concentration of B than an R-T-B-based alloy of the related art. FIG. 5 is an R-T-B ternary phase diagram. In FIG. 5, the vertical axis indicates the concentration of B, and the horizontal axis indicates the concentration of Nd. FIG. 5 illustrates that, as the concentration of B and the concentration of Nd decrease, the concentration of Fe increases. Generally, an alloy with a composition (for example, a composition indicated using a black Δ in FIG. 5) in a colored region is cast, thereby manufacturing an R-T-B-based magnet made up of the main phase and the R-rich phase. However, the compositions of the R-T-B-based alloys of the invention which satisfy the above Formula 1 are in a region on the low-B concentration side of the above region as illustrated using O in FIG. 5.

When an R-T-B-based alloy that satisfies the above Formula 1 is manufactured, an $R_2T_{17}$ phase is easily generated. The $R_2T_{17}$ phase is known as a cause of the degradation of the coercive force or squareness of an R-T-B-based magnet, and, generally, an R-T-B-based alloy is produced under a condition in which the $R_2T_{17}$ phase is not generated. However, in the invention, the $R_2T_{17}$ phase is considered to serve as a raw material for the transition metal-rich phase in a step of producing R-T-B-based alloys and/or a step of producing R-T-B-based magnets.

In the R-T-B-based alloy of the invention, the area ratio of a region including the $R_2T_{17}$ phase is preferably in a range of 0.1% to 50%, and more preferably in a range of 0.1% to 25%. In a case in which the area ratio of a region including the $R_2T_{17}$ phase is in the above range, the generation of the transition metal-rich phase is effectively accelerated, and an R-T-B-based magnet which sufficiently includes the transition metal-rich phase and has a large coercive force can be obtained. When the area ratio of a region including the $R_2T_{17}$ phase is 50% or more, it is not possible to fully consume the $R_2T_{17}$ phase in a step of producing R-T-B-based magnets, and there are cases in which the coercive force or squareness of an R-T-B-based magnet degrades.

Furthermore, in the R-T-B-based alloy of the embodiment, in a case in which the area ratio of a region including the $R_2T_{17}$ phase is in a range of 0.1% to 50%, excellent grindability can be obtained. Since the $R_2T_{17}$ phase is more brittle than an $R_2T_{14}B$ phase, in a case in which the R-T-B-based alloy of the invention includes a region including the $R_2T_{17}$ phase at an area ratio in a range of 0.1% to 50%, the alloy is easily ground, and thus it is possible to make the alloy into fine grains with a grain diameter of approximately 2 μm.

The area ratio of a region including the $R_2T_{17}$ phase is obtained by microscopically observing a cross-section of a thin cast alloy piece which will become an R-T-B-based alloy. Specifically, the area ratio is obtained in the following order.

A thin cast alloy piece is embedded in a resin, cut in the thickness direction of the thin cast alloy piece, mirror-polished, and then gold or carbon is deposited to supply a conductive property, thereby preparing an observation specimen. A backscattered electron image of the specimen is photographed using a scanning electron microscope at a magnification of 300 times or 350 times.

Figure 6:
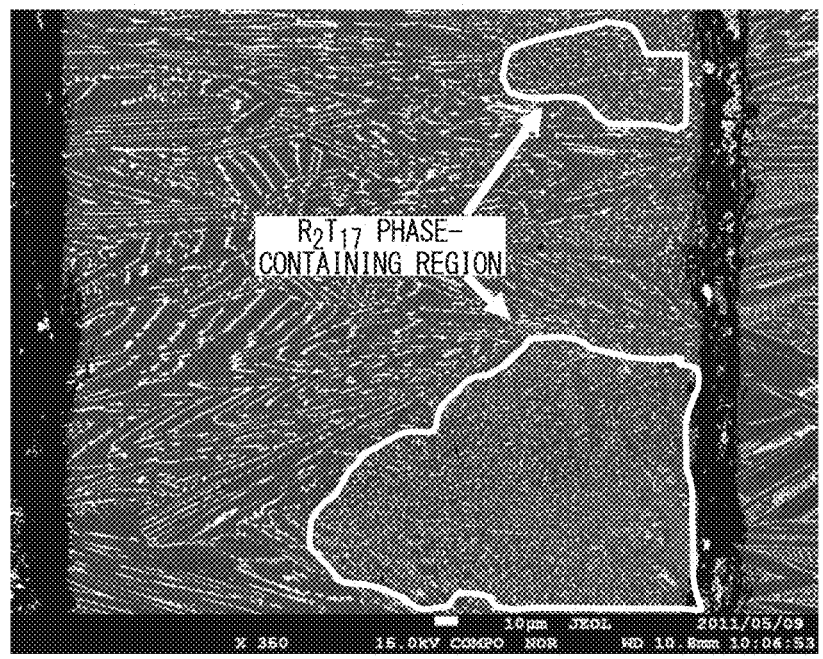
FIG. 6 is a backscattered electron image of a cross-section of Alloy F.

FIG. 6 illustrates a backscattered electron image of a cross-section of Alloy F described in Table 1 photographed at a magnification of 350 times as an example. In the image, a gray $R_2T_{14}B$ phase and white line-shaped R-rich phases are observed. Additionally, there are regions in which dot-shaped R-rich phases are observed (regions surrounded by white lines). In the present application, the above region will be called a region including the $R_2T_{17}$ phase. The ratio of the area of the region to a photograph of the cross-section will be called the area ratio of the region including the $R_2T_{17}$ phase.

Figure 7:
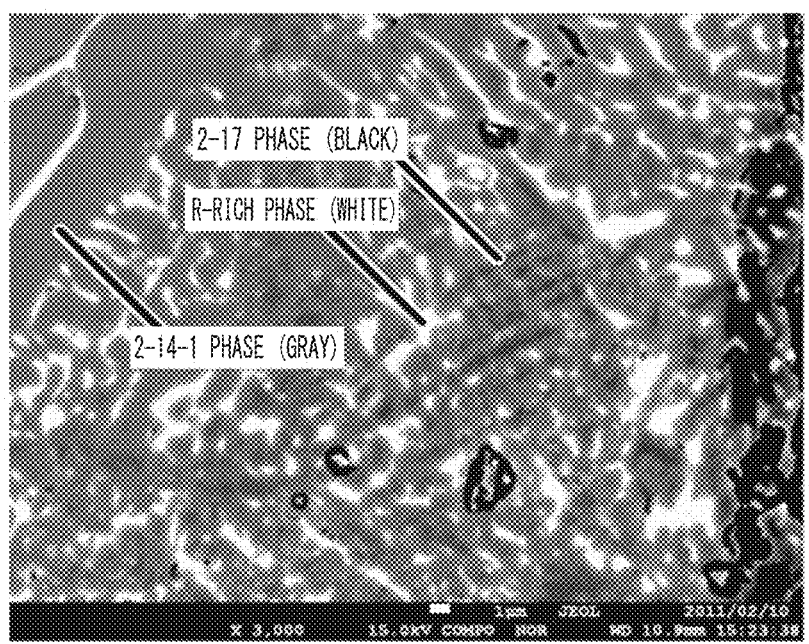
FIG. 7 is a view of an enlarged region in which an $R_2T_{17}$ phase is generated.

FIG. 7 is a high-magnification photograph of a region in which the $R_2T_{17}$ phase is generated. When FIG. 7 is strongly contrasted, it is found that black dot-shaped $R_2T_{17}$ phases (2-17 phases), white R-rich phases and gray main phases (2-14-1 phases) are generated in the region in which the $R_2T_{17}$ phase is generated.

The metallic element M contained in the R-T-B-based alloy of the embodiment is assumed to accelerate the generation of the transition metal-rich phase in a step of temporarily slowing the cooling rate of a thin cast alloy piece after casting which is carried out when producing the R-T-B-based alloy (temperature retention step of a cast alloy described below) or during sintering and a thermal treatment for producing the R-T-B-based magnet. The metallic element M contains one or more metals selected from Al, Ga and Cu, and is contained in a range of 0.1 at % to 2.4 at % in the R-T-B-based alloy.

Since the R-T-B-based alloy of the embodiment contains 0.1 at % to 2.4 at % of the metallic element M, when the R-T-B-based alloy is sintered, an R-T-B-based magnet including the R-rich phase and the transition metal-rich phase can be obtained.

One or more metals selected from Al, Ga and Cu, which are contained in the metallic element M, accelerate the generation of the transition metal-rich phase in the temperature retention step of the cast alloy or during the sintering or thermal treatment of the R-T-B-based magnet without adversely affecting other magnetic properties, thereby effectively improving the coercive force (Hcj).

When the amount of the metallic element M is less than 0.1 at %, there is a concern that the effect that accelerates the generation of the transition metal-rich phase may not be sufficiently developed such that the transition metal-rich phase is not formed in the R-T-B-based magnet and the coercive force (Hcj) of the R-T-B-based magnet cannot be sufficiently improved. In addition, when the amount of the metallic element M exceeds 2.4 at %, magnetic properties such as the remanence (Br) of the R-T-B-based magnet or the maximum energy product (BHmax) degrade. The amount of the metallic element M is more preferably in a range of 0.7 at % to 1.4 at %.

In a case in which the R-T-B-based alloy contains Cu, the concentration of Cu is preferably in a range of 0.07 at % to 1 at %. In a case in which the concentration of Cu is less than 0.07 at %, the magnet becomes difficult to sinter.

In addition, in a case in which the concentration of Cu exceeds 1 at %, the remanence (Br) of the R-T-B-based magnet degrades, which is not preferable.

The R-T-B-based alloy of the embodiment may further contain Si in addition to R which is a rare earth element, T which is a transition metal essentially containing Fe, a metallic element M containing one or more metals selected from Al, Ga and Cu, and B. In a case in which the R-T-B-based alloy contains Si, the amount of Si is preferably in a range of 0.7 at % to 1.5 at %. When the R-T-B-based alloy contains Si in the above range, the coercive force further improves. When the amount of Si is less than 0.7 at % or more than 1.5 at %, the effect of the inclusion of Si degrades.

In addition, when the total concentration of oxygen, nitrogen and carbon contained in the R-T-B-based alloy is high, in a step of sintering the R-T-B-based magnet described below, the rare earth element R bonds with the above elements, which leads to the consumption of the rare earth element R. Therefore, out of the rare earth element R contained in the R-T-B-based alloy, the amount of the rare earth element R that can be used as a raw material for the transition metal-rich phase in the thermal treatment of the R-T-B-based magnet obtained by sintering the alloy decreases. As a result, there is a concern that the generation amount of the transition metal-rich phase may decrease and the coercive force of the R-T-B-based magnet may become insufficient. Therefore, in the embodiment, the total concentration of oxygen, nitrogen and carbon contained in the R-T-B-based alloy is preferably 0.5 wt % or less. When the total concentration is set to the above concentration or less, the consumption of the rare earth element R is suppressed, and the coercive force (Hcj) can be effectively improved.

"Process of Producing the R-T-B-Based Alloy"

The R-T-B-based alloy of the invention is obtained as follows. For example, an approximately 1450° C.-hot molten alloy with a predetermined composition is cast using, for example, a strip cast (SC) method, thereby producing a thin cast alloy piece. At this time, a treatment (temperature retention step) in which the cooling rate of the thin cast alloy piece after the casting is temporarily slowed in a range of 700° C. to 900° C. so as to accelerate the diffusion of the components in the alloy may be carried out.

After that, the obtained thin cast alloy piece is cracked using a hydrogen decrepitation method or the like, and ground using a grinder, thereby obtaining an R-T-B-based alloy.

In the embodiment, a process in which an R-T-B-based alloy is produced using a production apparatus illustrated in FIG. 11 will be described as an example of a process of producing the R-T-B-based alloy of the invention.

(Apparatus for Producing the Alloy)

Figure 11:
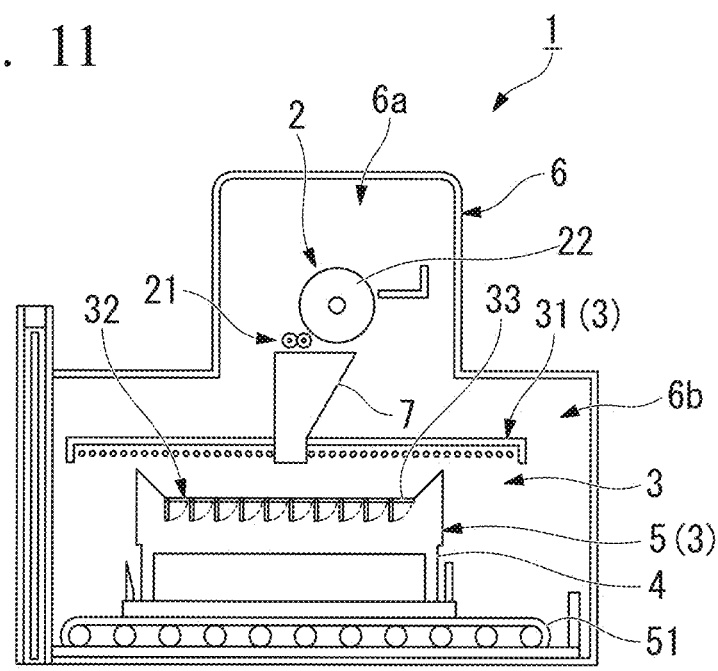
FIG. 11 is a schematic front view illustrating an example of an apparatus which is used to produce an alloy.

FIG. 11 is a schematic front view illustrating an example of an apparatus used to produce the alloy.

The apparatus used to produce the alloy 1 illustrated in FIG. 11 includes a casting apparatus 2, a crushing apparatus 21, a heating apparatus 3 disposed below the crushing apparatus 21 and a storage container 4 disposed below the heating apparatus 3.

The crushing apparatus 21 is an apparatus that crushes a cast alloy lump that is cast using the casting apparatus 2, thereby preparing thin cast alloy pieces. As illustrated in FIG. 11, a hopper 7 that guides the thin cast alloy pieces to an openable stage group 32 in the heating apparatus 3 is provided between the crushing apparatus 21 and the openable stage group 32.

The heating apparatus 3 is made up of a heating heater 31 and a container 5. The container 5 includes the storage container 4 and the openable stage group 32 installed above the storage container 4. The openable stage group 32 is made up of a plurality of openable stages 33. The openable stages 33 mount the thin cast alloy pieces supplied from the crushing apparatus 21 when in a close state, and send the thin cast alloy pieces to the storage container 4 when in an open state.

In addition, the production apparatus 1 includes a belt conveyor 51 (moving apparatus) that freely moves the container 5 so that the container 5 can be moved in the horizontal direction in FIG. 11 using the belt conveyor 51.

In addition, the production apparatus 1 illustrated in FIG. 11 includes a chamber 6. The chamber 6 includes a casting chamber 6a and a heat retention and storage chamber 6b which is installed below the casting chamber 6a and communicated with the casting chamber 6a. The casting chamber 6a accommodates the casting apparatus 2, and the heat retention and storage chamber 6b accommodates the heating apparatus 3.

In order to produce an R-T-B-based alloy in the embodiment, first, an approximately 1450° C.-hot molten alloy with a predetermined composition is prepared in a melting apparatus, not illustrated. Next, the obtained molten alloy is supplied to a cooling roll 22 made up of a copper roll for water cooling in the casting apparatus 2 using a tundish, not illustrated, and solidified, thereby preparing a cast alloy. After that, the cast alloy is detached from the cooling roll 22, and crushed between crushing rolls in the crushing apparatus 21, thereby preparing thin cast alloy pieces.

The crushed thin cast alloy pieces are made to pass through the hopper 7, and stacked on the openable stages 33 in a "close" state in the openable stage group 32 disposed below the hopper 7. The thin cast alloy pieces stacked on the openable stages 33 are heated using the heating heater 31.

In the embodiment, a temperature retention step in which the produced cast alloy that is hotter than 800° C. is maintained at a certain temperature for 10 seconds to 120 seconds until the temperature of the cast alloy reaches below 500° C. is carried out. In the embodiment, the thin cast alloy pieces start to be heated using the heating heater 31 from when the thin cast alloy pieces in a temperature range of 800° C. to 500° C. are supplied to the openable stages 33 and stacked on the openable stages 33. Then, the temperature retention step in which the cast alloy is maintained at a certain temperature for 10 seconds to 120 seconds begins.

After a predetermined time elapses, the openable stages 33 are switched into an "open" state, and the thin cast alloy pieces stacked on the openable stages 33 are dropped into the storage container 4. Then, heat from the heating heater 31 cannot reach the thin cast alloy pieces, the thin cast alloy pieces start to be cooled again, and the temperature retention step ends.

In a case in which the temperature retention step is carried out, it is assumed that, among the elements contained in the cast alloy, the component switching between the metallic element M containing one or more metals selected from Al, Ga and Cu; and B is accelerated due to the rearrangement of elements moving in the cast alloy. Then, it is assumed that some of B contained in a region which serves as the alloy grain boundary phase moves to the main phase, and some of the metallic element M contained in a region which serves as the main phase moves to the alloy grain boundary phase. As a result, it is assumed that the intrinsic magnetic properties of the main phase cannot be exhibited, and therefore the coercive force of an R-T-B-based magnet obtained using the alloy increases.

In a case in which the temperature of the cast alloy exceeds 800° C. in the temperature retention step, there is a concern that the alloy structure may coarsen. In addition, in a case in which the time exceeds 120 seconds during which the cast alloy is maintained at a certain temperature, there are cases in which productivity is adversely affected.

In addition, in a case in which the temperature of the cast alloy is lower than 500° C. in the temperature retention step or a case in which the time is less than 10 seconds during which the cast alloy is maintained at a certain temperature, there are cases in which the effect of the temperature retention step that rearranges elements cannot be sufficiently obtained.

Meanwhile, in the embodiment, the temperature retention step is carried out using a process in which the thin cast alloy pieces which are in a temperature range of 800° C. to 500° C. and stacked on the openable stages 33 are heated using the heating heater 31, but the process for carrying out the temperature retention step is not limited as long as the cast alloy hotter than 800° C. can be maintained at a certain temperature for 10 seconds to 120 seconds until the temperature of the cast alloy reaches below 500° C.

In addition, in the process of producing the R-T-B-based alloy of the embodiment, a reduced-pressure atmosphere of an inert gas is preferably formed in the chamber 6 in which the R-T-B-based alloy is produced. Furthermore, in the embodiment, at least a part of the casting step is preferably carried out in an atmosphere containing helium. Helium has a better capability that dissipates heat from the cast alloy than argon, and it is possible to easily increase the cooling rate of the cast alloy.

Examples of the process in which at least a part of the casting step is carried out in an atmosphere containing helium include a process in which helium is supplied as the inert gas at a predetermined flow rate into the casting chamber 6a in the chamber 6. In this case, since an atmosphere containing helium is formed in the casting chamber 6a, it is possible to efficiently cool the surfaces of the cast alloy, which is cast using the casting apparatus 2 and quenched using the cooling roll 22, which are not in contact with the cooling roll 22. Therefore, the cooling rate of the cast alloy increases, the grain diameter of the alloy structure decreases, the crushability becomes excellent, a fine alloy structure having an interval between the alloy grain boundary phases of 3 μm or less is easily obtained, and the coercive force of an R-T-B-based magnet produced using the alloy can be improved. In addition, in a case in which an atmosphere containing helium is formed in the casting chamber 6a, since the cooling rate of the cast alloy increases, it is possible to easily set the temperature of the thin cast alloy pieces stacked on the openable stages 33 to 800° C. or lower.

In addition, in the process of producing the R-T-B-based alloy of the embodiment, the thin cast alloy pieces which have been subjected to the temperature retention step are preferably cooled in an atmosphere containing helium. Then, since the cooling rate of the thin cast alloy pieces, which are the cast alloy that has been subjected to the temperature retention step, increases, the alloy structure is further minimized, and a fine alloy structure which has excellent crushability and an interval between the alloy grain boundary phases of 3 μm or less is easily obtained. Examples of a process for cooling the thin cast alloy pieces that have been subjected to the temperature retention step in an atmosphere containing helium include a process in which helium is supplied at a predetermined flow rate into the storage container 4 that accommodates the thin cast alloy pieces dropped from the openable stages 33.

Meanwhile, in the embodiment, a case in which the R-T-B-based alloy is produced using the SC method has been described, but the R-T-B-based alloy used in the invention is not limited to the alloy produced using the SC method. For example, the R-T-B-based alloy may be cast using a centrifugal casting method, a book mold method or the like.

The hydrogen decrepitation method is carried out in an order in which, for example, hydrogen is absorbed in the thin cast alloy pieces at room temperature, the thin cast alloy pieces are thermally treated in hydrogen at a temperature of approximately 300° C., then, the pressure is reduced so as to desorb hydrogen, and then the thin cast alloy pieces are thermally treated at a temperature of approximately 500° C., thereby removing hydrogen in the thin cast alloy pieces. In the hydrogen decrepitation method, since the volume of the thin cast alloy pieces that have absorbed hydrogen increases, a number of cracks are easily generated in the alloy, and the alloy is cracked.

In addition, jet milling or the like is used as a process for grinding the hydrogen-decrepitated thin cast alloy pieces. The hydrogen-decrepitated thin cast alloy pieces are put into a jet mill crusher, and finely crushed to an average grain diameter in a range of 1 μm to 4.5 μm using high-pressure, for example, 0.6 MPa nitrogen, thereby preparing powder. As the average grain size of the powder decreases, the coercive force of a sintered magnet can be further improved. However, when the grain size is not significantly decreased, the powder surfaces are easily oxidized, and, conversely, the coercive force decreases.

"Process of Producing the R-T-B-Based Rare Earth Sintered Magnets"

Next, a process of producing an R-T-B-based magnet using the R-T-B-based alloy of the embodiment obtained in the above manner will be described.

Examples of the process of producing an R-T-B-based magnet of the embodiment include a process in which 0.02 mass % to 0.03 mass % of zinc stearate is added to the powder of the R-T-B-based alloy of the embodiment as a lubricant, the powder is press-molded using a machine for molding in a transverse magnetic field or the like, sintered in a vacuum, and then thermally treated.

In a case in which the powder is sintered in a range of 800° C. to 1200° C., and more preferably in a range of 900° C. to 1200° C., and then thermally treated in a range of 400° C. to 800° C., the transition metal-rich phase is more easily generated in the R-T-B-based magnet, and an R-T-B-based magnet having a larger coercive force can be obtained.

In the embodiment, when the above Formula 1 is satisfied, the $R_2T_{17}$ phase is generated in the R-T-B-based alloy. The $R_2T_{17}$ phase is assumed to be used as a raw material for the transition metal-rich phase in the thermal treatment of an R-T-B-based magnet obtained by sintering the R-T-B-based alloy.

The thermal treatment after the sintering may be carried out just once or twice or more. For example, in a case in which the thermal treatment after the sintering is carried out just once, the thermal treatment is preferably carried out in a range of 500° C. to 530° C. In addition, in a case in which the thermal treatment after the sintering is carried out twice, the thermal treatment is preferably carried out at two temperatures in a range of 530° C. to 800° C. and in a range of 400° C. to 500° C.

In a case in which the thermal treatment is carried out at two temperatures, since the generation of the transition metal-rich phase is accelerated as described below, it is assumed that an R-T-B-based magnet having a superior coercive force can be obtained.

In a case in which the thermal treatment is carried out at two temperatures, in the first thermal treatment in a range of 530° C. to 800° C., the R-rich phase turns into a liquid phase and rotates around the main phase (2-14-1 phase). Then, in the second thermal treatment in a range of 400° C. to 500° C., a reaction among the R-rich phase, the 2-17 phase ($R_2T_{17}$ phase) and the metallic element M is accelerated, and the generation of the transition metal-rich phase is accelerated.

In the process of producing the R-T-B-based magnet of the embodiment, since an alloy having a amount of B which satisfies the above Formula 1 and 0.1 at % to 2.4 at % of the metallic element M is used as the R-T-B-based alloy, the R-T-B-based magnet of the invention which is made of a sintered body including a main phase 11 h primarily containing $R_2Fe_{14}B$ and a grain boundary phase containing more R than the main phase, in which the grain boundary phase includes an R-rich phase having a concentration of all atoms of rare earth elements of 70 at % or more and a transition metal-rich phase having a concentration of all atoms of rare earth elements in a range of 25 at % to 35 at % is obtained.

Furthermore, when the kind or use amount of the metallic element contained in the R-T-B-based alloy of the embodiment, the volume ratio of the region including the $R_2T_{17}$ phase, and the composition of the R-T-B-based alloy are adjusted in the above ranges, and the conditions such as the sintering temperature or the thermal treatment after sintering are adjusted, it is possible to easily adjust the volume ratio of the transition metal-rich phase in the R-T-B-based magnet to a preferable range of 0.005 vol % to 3 vol %.

In addition, an R-T-B-based magnet which suppresses the amount of Dy and has a predetermined coercive force suitable for use can be obtained by adjusting the volume ratio of the transition metal-rich phase in the R-T-B-based magnet.

In addition, the effect that improves the coercive force (Hcj), which is obtained in the R-T-B-based magnet of the invention, is assumed to result from the formation of the transition metal-rich phase containing a high concentration of Fe in the grain boundary phase. The volume ratio of the transition metal-rich phase included in the R-T-B-based magnet of the invention is preferably 0.005 vol % to 3 vol %, and more preferably 0.1 vol % to 2 vol %.

When the volume ratio of the transition metal-rich phase is in the above range, the effect of the inclusion of the transition metal-rich phase in the grain boundary phase that improves the coercive force can be more effectively obtained. In contrast to what has been described above, when the volume ratio of the transition metal-rich phase is less than 0.1 vol %, there is a concern that the effect that improves the coercive force (Hcj) may become insufficient. In addition, when the volume ratio of the transition metal-rich phase exceeds 3 vol %, adverse effects on the magnetic properties, such as the degradation of the remanence (Br) or the maximum energy product ((BH)max), are caused, which is not preferable.

The concentration of Fe atoms in the transition metal-rich phase is preferably 50 at % to 70 at %. When the concentration of Fe atoms in the transition metal-rich phase is in the above range, the effect of the inclusion of the transition metal-rich phase can be more effectively obtained. In contrast to what has been described above, when the concentration of Fe atoms in the transition metal-rich phase is below the above range, there is a concern that the effect of the inclusion of the transition metal-rich phase in the grain boundary phase that improves the coercive force (Hcj) may become insufficient. In addition, when the concentration of Fe atoms in the transition metal-rich phase is beyond the above range, there is a concern that the $R_2T_{17}$ phase or Fe may be precipitated such that the magnetic properties are adversely affected.

In the invention, the volume ratio of the transition metal-rich phase in the R-T-B-based magnet is investigated using a process described below. First, the R-T-B-based magnet is embedded in a conductive resin, a surface in parallel with the orientation direction is cut, and mirror-polished. Next, the mirror-polished surface is observed using a backscattered electron image at a magnification of approximately 1500 times, and the main phase, the R-rich phase and the transition metal-rich phase are determined using contrast. After that, the area ratio of the transition metal-rich phase per cross-section is computed, and, furthermore, the volume ratio is computed with an assumption that the transition metal-rich phase is spherical.

Since the R-T-B-based magnet of the embodiment is formed by molding and sintering an R-T-B-based alloy having a amount of B/TRE which satisfies the above Formula 1 and 0.1 at % to 2.4 at % of the metallic element M, the grain boundary phase includes the R-rich phase and the transition metal-rich phase, and the transition metal-rich phase has a lower concentration of the rare earth elements and a higher concentration of Fe atoms than the R-rich phase, the R-T-B-based magnet suppresses the amount of Dy, and has a large coercive force and magnetic properties excellent enough to be a preferable material for motors.

Meanwhile, in the embodiment, it is also possible to make the R-T-B-based magnet have a higher concentration of Dy on the surface of the sintered magnet than in the magnet by attaching Dy metal or a Dy compound to the surface of the sintered R-T-B-based magnet, thermally treating the magnet, and diffusing Dy in the sintered magnet, thereby further improving the coercive force.

The R-T-B-based magnet having a higher concentration of Dy on the surface of the sintered magnet than in the magnet is specifically produced as follows. For example, the sintered R-T-B-based magnet is immersed in a coating fluid obtained by mixing a solvent such as ethanol and dysprosium fluoride ($DyF_3$) at a predetermined ratio, thereby applying the coating fluid to the R-T-B-based magnet. After that, a diffusion step in which a two-step thermal treatment is carried out on the R-T-B-based magnet to which the coating fluid has been applied is carried out. Specifically, a first thermal treatment in which the R-T-B-based magnet to which the coating fluid has been applied is heated at a temperature of 900° C. for approximately one hour in an argon atmosphere, and the R-T-B-based magnet that has been subjected to the first thermal treatment is cooled to room temperature. After that, a second thermal treatment in which the R-T-B-based magnet is again heated at a temperature of 500° C. for approximately one hour in an argon atmosphere is carried out, and cooled to room temperature.

In addition to the above process, a process in which a metal is gasified and a film of the gaseous metal is attached to the surface of the magnet, a process in which an organic metal is decomposed so as to attach a film to the surface, and the like may be used as a process in which Dy metal or a Dy compound is attached to the surface of the sintered R-T-B-based magnet.

Meanwhile, instead of Dy metal or a Dy compound, Tb metal or a Tb compound may be attached to the surface of the sintered R-T-B-based magnet and thermally treated. In this case, for example, when a coating fluid containing a fluoride of Tb is applied to the surface of the sintered R-T-B-based magnet, and thermally treated, thereby diffusing Tb in the sintered magnet, it is possible to obtain an R-T-B-based magnet having a higher concentration of Tb on the surface of the sintered magnet than in the magnet, and the coercive force can be further improved.

In addition, it is also possible to further improve the coercive force by depositing and thermally treating metal Dy or metal Tb on the surface of the R-T-B-based magnet and by diffusing Dy or Tb in the sintered magnet. In the R-T-B-based magnet of the embodiment, any of the above techniques can be used without any adverse effect.

The coercive force (Hcj) of the R-T-B-based magnet is preferably larger. In a case in which the R-T-B-based magnet is used as a magnet in an electromotive power steering motor of an automobile or the like, the coercive force is preferably 20 kOe or more, and in a case in which the R-T-B-based magnet is used as a magnet in a motor of an electric vehicle, the coercive force is preferably 30 kOe or more. When the coercive force (Hcj) of the magnet in a motor of an electric vehicle is less than 30 kOe, there are cases in which the heat resistance becomes insufficient for motors.

Second Embodiment

In the first embodiment, the R-T-B-based magnet was produced using the R-T-B-based alloy containing the metallic element; however, in a second embodiment, unlike the first embodiment, the R-T-B-based magnet will be produced using an alloy material for R-T-B-based rare earth sintered magnets containing a powder-form R-T-B-based alloy containing no metallic element and an additional metal (hereinafter, abbreviated to "R-T-B-based alloy material").

When the R-T-B-based alloy material of the present embodiment is molded and sintered in the same manner as in the first embodiment, the R-T-B-based magnet of the first embodiment can be obtained.

The R-T-B-based alloy material of the embodiment is an R-T-B-based alloy material including an R-T-B-based alloy containing R which is a rare earth element, T which is a transition metal essentially containing Fe, B and inevitable impurities, in which R accounts for 13 at % to 15 at %, B accounts for 4.5 at % to 6.2 at %, T accounts for balance, the proportion of Dy in all rare earth elements is in a range of 0 at % to 65 at %, and the following Formula 1 is satisfied; and an additional metal made of a metallic elements M comprising one or more metals selected from Al, Ga and Cu or an alloy containing the metallic element M, in which the metallic element M is contained in a range of 0.1 at % to 2.4 at %, $$0.0049Dy+0.34 \leq B/TRE \leq 0.0049Dy+0.36 \qquad \text{Formula 1}$$

in Formula 1, Dy represents a concentration (at %) of a Dy element, B represents a concentration (at %) of a boron element, and TRE represents a concentration (at %) of all the rare earth elements.

The R-T-B-based alloy material of the embodiment can be produced in the same manner as the R-T-B-based alloy of the first embodiment using the same R-T-B-based alloy as in the first embodiment except for the fact that the alloy does not contain the metallic element M. Therefore, the R-T-B-based alloy included in the R-T-B-based alloy material of the embodiment will not be described.

Similarly to the R-T-B-based alloy of the first embodiment, in the R-T-B-based alloy included in the R-T-B-based alloy material of the embodiment as well, the area ratio of the region including the $R_2T_{17}$ phase is preferably 0.1% to 50%, and more preferably 0.1% to 25%. In a case in which the area ratio of the region including the $R_2T_{17}$ phase is in the above range, the generation of the transition metal-rich phase is effectively accelerated, and an R-T-B-based magnet which sufficiently includes the transition metal-rich phase and has a large coercive force can be obtained. When the area ratio of the region including the $R_2T_{17}$ phase is 50% or more, there are cases in which it is not possible to fully consume the $R_2T_{17}$ phase in a step of producing the R-T-B-based magnet, and there are cases in which the coercive force or squareness of the R-T-B-based magnet decreases.

Furthermore, in the R-T-B-based alloy included in the R-T-B-based alloy material of the embodiment as well, in a case in which the area ratio of the region including the $R_2T_{17}$ phase is in a range of 0.1% to 50%, since excellent crushability can be obtained, the alloy is easily crushed, and it is possible to make the alloy into fine particles having a grain diameter of approximately 2 μm.

Meanwhile, the area ratio of the region including the $R_2T_{17}$ phase in the R-T-B-based alloy included in the R-T-B-based alloy material of the embodiment can be obtained in the same manner as in the R-T-B-based alloy of the first embodiment.

The additional metal contained in the R-T-B-based alloy material of the embodiment is made of a metallic elements M comprising one or more metals selected from Al, Ga and Cu or an alloy containing the metallic element M.

The metallic element M is assumed to accelerate the generation of the transition metal-rich phase during sintering and the thermal treatment for producing the R-T-B-based magnet.

The metallic element M is contained at 0.1 at % to 2.4 at % in the R-T-B-based alloy material. The amount of the metallic element M is more preferably in a range of 0.7 at % to 1.4 at %. Since the R-T-B-based alloy material of the embodiment contains 0.1 at % to 2.4 at % of the metallic element M, an R-T-B-based magnet including the R-rich phase and the transition metal-rich phase can be obtained by sintering the alloy material.

One or more metals selected from Al, Ga and Cu, which are contained in the metallic element M accelerates the generation of the transition metal-rich phase during the sintering and thermal treatment of the R-T-B-based magnet without adversely affecting other magnetic properties, thereby effectively improving the coercive force (Hcj).

When the amount of the metallic element M is less than 0.1 at %, there is a concern that the effect that accelerates the generation of the transition metal-rich phase may be not sufficient such that the transition metal-rich phase is not formed in the R-T-B-based magnet and it is not possible to sufficiently improve the coercive force (Hcj) of the R-T-B-based magnet. In addition, when the amount of the metallic element M exceeds 2.4 at %, magnetic properties such as the remanence (Br) of the R-T-B-based magnet or the maximum energy product (BHmax) degrade.

In a case in which the R-T-B-based alloy material contains Cu, the concentration of Cu is preferably 0.07 at % to 1 at %. In a case in which the concentration of Cu is less than 0.07 at %, the magnet becomes difficult to sinter. In addition, in a case in which the concentration of Cu exceeds 1 at %, the remanence (Br) of the R-T-B-based magnet degrades, which is not preferable.

The R-T-B-based alloy material of the embodiment may further contain Si in addition to the R-T-B-based alloy and the additional metal. In a case in which the R-T-B-based alloy material contains Si, the amount of Si is preferably in a range of 0.7 at % to 1.5 at %. When the amount of Si is in the above range, the coercive force further improves. The effect of the inclusion of Si weakens when the amount of Si is both less than 0.7 at % and more than 1.5 at %.

"Process of Producing the R-T-B-Based Alloy Material"

The R-T-B-based alloy contained in the R-T-B-based alloy material of the invention can be produced in the same manner as the R-T-B-based alloy of the first embodiment. In addition, when the powder of the obtained R-T-B-based alloy and the powder of the additional metal are mixed, the R-T-B-based alloy material can be obtained.

"Process of Producing the R-T-B-Based Rare Earth Sintered Magnet"

The R-T-B-based magnet can be produced using the R-T-B-based alloy material of the embodiment, which is obtained in the above manner, in the same manner as in a case in which the R-T-B-based alloy of the first embodiment is used.

Meanwhile, generally, the grain size of the powder of the R-T-B-based alloy is set in a range of 4 µm to 5 µm at d50 in order to improve the coercive force of the R-T-B-based magnet; however, when the grain size is further decreased so as to decrease the sizes of the grains in the R-T-B-based magnet, it is possible to further improve the coercive force.

Meanwhile, even in the embodiment, similarly to the first embodiment, it is possible to further improve the coercive force by applying a fluoride of Dy or Tb to the surface of the R-T-B-based magnet, thermally treating the fluoride, and diffusing Dy or Tb in the sintered magnet. In addition, it is also possible to further improve the coercive force by depositing Dy metal or Tb metal on the surface of the R-T-B-based magnet, thermally treating the magnet, and diffusing Dy or Tb in the sintered magnet.

In the process of producing the R-T-B-based magnet of the embodiment, since an alloy material in which the amount of B satisfies the above Formula 1 and the metallic element M is contained at 0.1 at % to 2.4 at % is used as the R-T-B-based alloy material, the R-T-B-based magnet of the invention which is made of a sintered body including a main phase primarily containing $R_2Fe_{14}B$ and a grain boundary phase containing more R than the main phase, in which the grain boundary phase includes the R-rich phase having a concentration of all atoms of the rare earth elements of 70 at % or more and the transition metal-rich phase having a concentration of all the atoms of the rare earth elements in a range of 25 at % to 35 at % can be obtained.

Furthermore, when the kind or use amount of the metallic element M contained in the R-T-B-based alloy of the embodiment, the volume ratio of the region including the $R_2T_{17}$ phase, and the composition of the R-T-B-based alloy are adjusted in the above ranges of the invention, and the conditions such as the sintering temperature or the thermal treatment after sintering are adjusted, it is possible to easily adjust the volume ratio of the transition metal-rich phase in the R-T-B-based magnet to a preferable range of 0.005 vol % to 3 vol %. In addition, the R-T-B-based magnet which suppresses the amount of Dy and has a predetermined coercive force suitable for use can be obtained by adjusting the volume ratio of the transition metal-rich phase in the R-T-B-based magnet.

Since the R-T-B-based magnet of the embodiment is formed by molding and sintering an R-T-B-based alloy material having a amount of B/TRE which satisfies the above Formula 1 and having 0.2 at % to 5 at % of the metallic element M, the grain boundary phase includes the R-rich phase and the transition metal-rich phase, and the transition metal-rich phase has a lower concentration of all atoms of the rare earth elements than the R-rich phase and a higher concentration of Fe atoms than the R-rich phase, the R-T-B-based magnet suppresses the amount of Dy, and has a large coercive force and magnetic properties excellent enough to be a preferable material for motors.

Third Embodiment

In the second embodiment, the R-T-B-based alloy material containing the powder-form R-T-B-based alloy containing no metallic element and the additional metal has been described, however, in the present embodiment, an R-T-B-based alloy material containing an R-T-B-based alloy containing a metallic element and the additional metal will be described. That is, in the invention, the metallic element may be added to the R-T-B-based alloy material in a step of casting the R-T-B-based alloy, in a step before the sintering of the R-T-B-based alloy, or in both steps.

In a third embodiment, some of the metallic element contained in the R-T-B-based alloy material is added to the R-T-B-based alloy, and the powder of the R-T-B-based alloy and the remnant of the metallic element are mixed, thereby preparing an R-T-B-based alloy material, and an R-T-B-based magnet is produced using the R-T-B-based alloy material.

When the R-T-B-based alloy material of the embodiment is molded and sintered in the same manner as in the first and second embodiments, the R-T-B-based magnets of the first and second embodiments can be obtained.

The R-T-B-based alloy material of the embodiment is an R-T-B-based alloy material including an R-T-B-based alloy containing R which is a rare earth element, T which is a transition metal essentially containing Fe, a first metal comprising one or more metals selected from Al, Ga and Cu, B and inevitable impurities, in which R accounts for 13 at % to 15 at %, B accounts for 4.5 at % to 6.2 at %, T accounts for balance, the proportion of Dy in all rare earth elements is in a range of 0 at % to 65 at %, and the following Formula 1 is satisfied; and an additional metal made of a second metal comprising one or more metals selected from Al, Ga and Cu or an alloy containing the second metal, in which the first metal and the second metal are contained in a range of 0.1 at. % to 2.4 at. % in total, $$0.0049Dy+0.34 \leq B/TRE \leq 0.0049Dy+0.36 \qquad \text{Formula 1}$$

in Formula 1, Dy represents a concentration (at %) of a Dy element, B represents a concentration (at %) of a boron element, and TRE represents a concentration (at %) of all the rare earth elements.

Both the first and second metals are one or more metals selected from Al, Ga and Cu, and the same composition as the metallic element M in the first and second embodiment is formed using the sum of the first and second metals.

In addition, the amount of the sum of the first and second metals in the R-T-B-based alloy material is the same as those of the metallic element M in the first and second embodiments.

The R-T-B-based alloy material of the embodiment is the same as the R-T-B-based alloy material of the second embodiment except for the fact that the R-T-B-based alloy contains the first metal, and the R-T-B-based magnet is the same as in the first and second embodiments. Therefore, the R-T-B-based material and the R-T-B-based magnet of the embodiment will not be described.

Here, a process for generating the transition metal-rich phase included in the R-T-B-based magnet of the invention will be described in detail.

In the invention, it is considered that the $R_2T_{17}$ phase included in the R-T-B-based alloy in the middle of being produced and/or the R-T-B-based magnet in the middle of being produced is used as a raw material for the transition metal-rich phase in the R-T-B-based magnet in the thermal treatment that is carried out once or plural times in a step of producing the R-T-B-based alloy and/or a step of producing the R-T-B-based magnet so as to generate the transition metal-rich phase.

The conditions of the thermal treatment that generates the transition metal-rich phase are determined depending on the kind or use amount of the metallic element M, which is used together with the $R_2T_{17}$ phase as a raw material for the transition metal-rich phase, the generation amount of the $R_2T_{17}$ phase included in the R-T-B-based alloy and/or the sintered R-T-B-based magnet, the composition of the R-T-B-based magnet, the generation amount of the necessary transition metal-rich phase, and the like.

The thermal treatment that generates the transition metal-rich phase, specifically, can be carried out once or plural times on the R-T-B-based alloy in the middle of being produced and/or the R-T-B-based magnet in the middle of being produced at a temperature in a range of 400° C. to 800° C., and more preferably in a range of 450° C. to 650° C., and the thermal treatment is preferably carried out in the step of producing the R-T-B-based alloy and/or the step of producing the R-T-B-based magnet for a total of 0.5 hours to 5 hours, and more preferably for a total of 1 hour to 3 hours.

When the temperature of the thermal treatment that generates the transition metal-rich phase is lower than 400° C., there are cases in which the reaction among the rare earth element R, the 2-17 phase ($R_2T_{17}$ phase) and the metallic element M during the thermal treatment becomes insufficient and the transition metal-rich phase is not sufficiently generated. When the temperature of the thermal treatment that generates the transition metal-rich phase exceeds 800° C., there are cases in which atoms are rearranged in a way that the transition metal-rich phase is not sufficiently generated.

In addition, when the total time of the thermal treatment that generates the transition metal-rich phase is less than 0.5 hours, there are cases in which the reaction among the rare earth element R, the 2-17 phase ($R_2T_{17}$ phase) and the metallic element M during the thermal treatment becomes insufficient and the transition metal-rich phase is not sufficiently generated. When the total time of the thermal treatment that generates the transition metal-rich phase exceeds 5 hours, the thermal treatment takes a long time so as to adversely affect productivity, which is not preferable.

The thermal treatment that generates the transition metal-rich phase is carried out once or plural times in the step of producing the R-T-B-based alloy and/or the step of producing the R-T-B-based magnet. The thermal treatment may be intended only for the generation of the transition metal-rich phase or may be carried out using another thermal treatment with a different intention such as sintering. The number of times of the thermal treatment necessary to generate the transition metal-rich phase is not particularly limited, but is preferably carried out a plurality of times in order to sufficiently generate the transition metal-rich phase.

Specifically, as the thermal treatment that generates the transition metal-rich phase, one or more treatments selected from the following treatments can be used: a treatment (temperature retention step) in which the cooling rate of the thin cast alloy pieces after casting, which is carried out when producing the R-T-B-based alloy, is temporarily slowed so as to accelerate the diffusion of components in the alloy, a thermal treatment for generating the transition metal-rich phase in the sintered R-T-B-based magnet, a thermal treatment for diffusing Dy or Tb in the sintered R-T-B-based magnet, and the like.

Meanwhile, the thermal treatment that generates the transition metal-rich phase is preferably carried out at a temperature in a range of 400° C. to 800° C., but the optimal temperature in the above range differs depending on the state of the structure of the R-T-B-based alloy or the R-T-B-based magnet being thermally treated, for example, the optimal temperature before sintering and the optimal temperature after sintering are different, and therefore the optimal temperature is appropriately determined by the step in which the thermal treatment is carried out among the step of casting the R-T-B-based alloy through the completion of the R-T-B-based magnet.

In addition, there is a tendency for the generation amount of the transition metal-rich phase obtained through the thermal treatment that generates the transition metal-rich phase to increase as the time of the thermal treatment that generates the transition metal-rich phase increases. However, in a case in which the temperature of the R-T-B-based alloy or the R-T-B-based magnet reaches the decomposition temperature of the transition metal-rich phase or higher in steps after the thermal treatment that generates the transition metal-rich phase, there is a possibility that part or all of the generated transition metal-rich phase is decomposed and decreased.

In the thermal treatment that generates the transition metal-rich phase, it is assumed that the reactions represented by the following Formula 3 and/or Formula 4 proceed.

In more detail, in a case in which the metallic element M that is used as a raw material for the transition metal-rich phase in the thermal treatment is solely present in the R-T-B-based alloy or the R-T-B-based magnet, which is a material being thermally treated, it is assumed that the reaction represented by the following Formula 3 proceeds in the thermal treatment that generates the transition metal-rich phase, and the like.

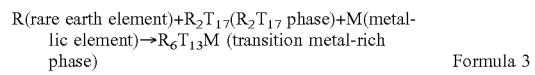

R(rare earth element)+$R_2T_{17}$($R_2T_{17}$ phase)+M(metallic element)→$R_6T_{13}$M (transition metal-rich phase)     Formula 3

Examples of the case in which the metallic element M is solely present in a material being thermally treated include a thermal treatment for sintering which is carried out when producing the R-T-B-based magnet using the R-T-B-based alloy material containing the R-T-B-based alloy containing no metallic element and the additional metal, and the like.

In addition, in a case in which the metallic element M is contained in the alloy grain boundary phase or the grain boundary phase in a material being thermally treated, it is assumed that the reaction represented by the following Formula 4 proceeds in the thermal treatment that generates the transition metal-rich phase.

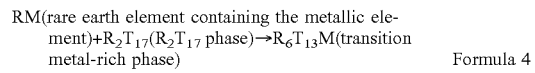

RM(rare earth element containing the metallic element)+$R_2T_{17}$($R_2T_{17}$ phase)→$R_6T_{13}$M(transition metal-rich phase)     Formula 4

Examples of the case in which the metallic element M is contained in the alloy grain boundary phase or the grain boundary phase in a material being thermally treated include a thermal treatment for sintering which is carried out when producing the R-T-B-based magnet using the R-T-B-based alloy containing the metallic element, and the like.

In a case in which both a material solely containing the metallic element M and a material containing the metallic element in the alloy grain boundary phase or the grain boundary phase are thermally treated, it is assumed that the reaction represented by the above Formula 3 and the reaction represented by Formula 4 proceed at the same time in the thermal treatment that generates the transition metal-rich phase. Examples of the above case include a thermal treatment for sintering which is carried out when producing the R-T-B-based magnet using the R-T-B-based alloy material containing the R-T-B-based alloy containing the metallic element and the additional metal, and the like.

The size of the $R_2T_{17}$ phase in the R-T-B-based alloy is preferably smaller. When the size of the $R_2T_{17}$ phase is large, it is not possible to fully remove the $R_2T_{17}$ phase even when the reaction represented by Formula 3 or Formula 4 is caused, and there are cases in which the $R_2T_{17}$ phase remains in the R-T-B-based magnet such that the coercive force or squareness degrades. Specifically, the size of the $R_2T_{17}$ phase is preferably 10 μm or less, and more preferably 3 μm or less. Meanwhile, the size of the $R_2T_{17}$ phase refers to the size of a single $R_2T_{17}$ phase, and is not the size of a region in which the $R_2T_{17}$ phase is present.

As such, in the invention, it is assumed that, when the thermal treatment that generates the transition metal-rich phase is carried out, the transition metal-rich phase in the R-T-B-based magnet is generated using the $R_2T_{17}$ phase and the rare earth element R containing the metallic element M (or the metallic element M and the rare earth element R) as raw materials as described in Formula 3 and/or Formula 4.

EXAMPLES

Experiment Examples 1 to 17 and 41 to 46

Nd metal (purity: 99 wt % or more), Pr metal (purity: 99 wt % or more), Dy metal (purity 99 wt % or more), ferro-boron (Fe 80 wt %, B 20 wt %), iron ingot (purity: 99 wt % or more), Al metal (purity: 99 wt % or more), Ga metal (purity: 99 wt % or more) and Cu metal (purity: 99 wt % or more) were weighed so as to obtain the alloy compositions of Alloys A to L, N to Q and T to Z described in Table 1, furthermore, 2.3 at % of Co metal (purity: 99 wt % or more) was weighed, and the components were loaded in an alumina crucible.

Meanwhile, the amounts of Si described in the alloy compositions described in Table 1 refers to the amounts of Si that is not intentionally added to the alloy but is contained in the alloy as an impurity. In addition, Alloy N is an alloy manufactured with an intention of adding no metallic element M, Alloy O is an alloy manufactured with an intention of adding only Al as the metallic element M, Alloy P is an alloy manufactured with an intention of adding only Ga as the metallic element M, and Alloy Q is an alloy manufactured with an intention of adding only Cu as the metallic element M. In addition, Al contained in Alloys N, P and Q is an element that is not intentionally added but is incorporated from the alumina crucible.

After that, the inside of a high-frequency vacuum induction furnace into which the alumina crucible had been put was substituted with Ar, heated to 1450° C. so as to melt the components, the molten alloy was poured into a copper roll with water cooling, and cast using a strip casting (SC) method at a roll rotating rate of 1.0 m/second so as to obtain an average thickness of approximately 0.3 mm, thereby obtaining thin cast alloy pieces.

Next, the thin cast alloy pieces were cracked using a hydrogen decrepitation method described below. First, the thin cast alloy pieces were coarsely cracked so as to obtain a diameter of approximately 5 mm, and put into a hydrogen atmosphere so as to absorb hydrogen. Subsequently, a thermal treatment in which the thin cast alloy pieces that had been coarsely crushed so as to absorb hydrogen were heated to 300° C. in a hydrogen atmosphere was carried out. After that, a thermal treatment in which the pressure was reduced so as to desorb hydrogen and, furthermore, the thin cast alloy pieces were heated to 500° C. was carried out so as to emit and remove the hydrogen in the thin cast alloy pieces, and the thin cast alloy pieces were cooled to room temperature.

Next, zinc stearate (0.025 wt %) was added to the hydrogen-decrepitated thin cast alloy pieces as a lubricant, and the hydrogen-decrepitated thin cast alloy pieces were finely crushed to an average grain size (d50) of 4.5 μm using a jet mill (Hosokawa Micron 100AFG) and high-pressure nitrogen (0.6 MPa), thereby obtaining a powder-form R-T-B-based alloy.

The area ratios of the $R_2T_{17}$ phases in Alloys A to L, N to Q and T to Z obtained in the above manner were investigated using a method described below.

A thin cast alloy piece having a thickness in a range of ±10% of the average thickness was embedded in a resin, a cross-section was cut in the thickness direction, the cross-section was mirror-polished, and then gold or carbon for supplying conductivity was deposited, thereby preparing an observation specimen. A backscattered electron image of the specimen was photographed at a magnification of 350 times using a scanning electron microscope (JSM-5310 manufactured by JEOL Ltd.).

FIG. 6 illustrates the backscattered electron image of Alloy F as an example. In addition, the area ratios of the $R_2T_{17}$ phases in the measured alloys among Alloys A to L, N to Q and T to Z are described in Table 4. In Table 4, symbol '-' indicates that the area ratio of the corresponding alloy is not measured.

Next, the powder-form R-T-B-based alloy obtained in the above manner was press-molded using a machine for molding in a transverse magnetic field at a molding pressure of 0.8 t/cm², thereby preparing green compact. After that, the obtained green compact was sintered at a temperature in a range of 900° C. to 1200° C. in a vacuum. After that, the green compact was thermally treated at two different temperatures of 800° C. and 500° C. and cooled, thereby manufacturing R-T-B-based magnets of Experiment Examples 1 to 17 and Experiment Examples 41 to 46.

In addition, the magnetic properties of the respective R-T-B-based magnets obtained in Experiment Examples 1 to 17 and Experiment Examples 41 to 46 were measured using a BH curve tracer (TPM 2-10 manufactured by Toei Industry Co., Ltd.). The results are described in Table 4.

Experiment Examples 18 to 33

The powder-form R-T-B-based alloys obtained in Experiment Examples 1 to 17 (Alloys A to H, J to L and N to Q) and powder-form Alloy R and Si powder having an average grain size (d50) of 4.35 μm were prepared, the powder-form alloy and Si powder were mixed so as to obtain the composition of a sintered magnet described in Table 2, thereby producing R-T-B-based alloy materials of Experiment Examples 18 to 33. Meanwhile, the grain size of the Si powder was measured using a laser diffractometer.

Next, R-T-B-based magnets were manufactured in the same order as in Experiment Example 1 to 15 using the R-T-B-based alloy materials obtained in the above manner.

In addition, the magnetic properties of the respective R-T-B-based magnets obtained in Experiment Examples 18 to 33 were measured in the same manner as in Experiment Examples 1 to 17 using a BH curve tracer (TPM 2-10 manufactured by Toei Industry Co., Ltd.). The results are described in Table 5.

Experiment Example 34

Nd metal (purity: 99 wt % or more), Pr metal (purity: 99 wt % or more), Dy metal (purity 99 wt % or more), ferro-boron (Fe 80 wt %, B 20 wt %), iron ingot (purity: 99 wt % or more), Si metal (purity: 99 wt % or more), Al metal (purity: 99 wt % or more), Ga metal (purity: 99 wt % or more) and Cu metal (purity: 99 wt % or more) were weighed so as to obtain the alloy compositions of Alloy S described in Table 3, furthermore, 2.3 at % of Co metal (purity: 99 wt % or more) was weighed, the components were loaded in an alumina crucible, a powder-form R-T-B-based alloy was obtained in the same order as in Experiment Examples 1 to 17, and an R-T-B-based magnet was manufactured in the same order as in Experiment Examples 1 to 17 using the powder-form R-T-B-based alloy.

In addition, the magnetic properties of the respective R-T-B-based magnets obtained in Experiment Example 34 were measured in the same manner as in Experiment Examples 1 to 17 using a BH curve tracer (TPM 2-10 manufactured by Toei Industry Co., Ltd.). The results are described in Table 6.

TABLE 1

| Alloy | Experiment Example | Alloy composition (at %) | | | | | | | | | | |
|---|---|---|---|---|---|---|---|---|---|---|---|---|
| | | R in total | Nd | Pr | Dy | B | Fe | Si | Ga | Al | Cu | M |
| A | 1 | 14.5 | 12.36 | 2.17 | 0.00 | 5.25 | 77.2 | 0.07 | 0.07 | 0.34 | 0.10 | 0.51 |
| B | 2 | 15.1 | 12.89 | 2.17 | 0.00 | 5.29 | 76.6 | 0.07 | 0.07 | 0.34 | 0.11 | 0.52 |
| C | 3 | 13.9 | 11.79 | 2.14 | 0.00 | 5.27 | 77.8 | 0.07 | 0.07 | 0.35 | 0.10 | 0.52 |
| D | 4 | 14.9 | 12.72 | 2.18 | 0.00 | 5.16 | 76.9 | 0.08 | 0.07 | 0.38 | 0.10 | 0.55 |
| E | 5 | 13.8 | 7.59 | 2.28 | 3.88 | 5.22 | 78.0 | 0.06 | 0.07 | 0.34 | 0.07 | 0.48 |
| F | 6 | 14.1 | 7.97 | 2.31 | 3.87 | 5.30 | 77.5 | 0.09 | 0.07 | 0.35 | 0.07 | 0.49 |
| G | 7 | 14.9 | 8.59 | 2.32 | 3.95 | 5.38 | 76.8 | 0.08 | 0.07 | 0.36 | 0.07 | 0.50 |
| H | 8 | 14.0 | 7.93 | 2.27 | 3.82 | 4.89 | 78.1 | 0.07 | 0.07 | 0.36 | 0.07 | 0.50 |
| I | 9 | 13.7 | 7.53 | 2.27 | 3.84 | 6.13 | 77.3 | 0.08 | 0.07 | 0.34 | 0.07 | 0.48 |
| J | 10 | 13.8 | 3.21 | 2.25 | 8.30 | 5.40 | 77.8 | 0.08 | 0.07 | 0.36 | 0.07 | 0.50 |
| K | 11 | 14.4 | 3.73 | 2.25 | 8.38 | 5.45 | 77.1 | 0.06 | 0.07 | 0.34 | 0.07 | 0.48 |
| L | 12 | 13.3 | 2.73 | 2.25 | 8.25 | 5.34 | 78.4 | 0.07 | 0.07 | 0.33 | 0.07 | 0.47 |
| T | 13 | 14.9 | 8.72 | 2.56 | 3.61 | 6.17 | 77.3 | 0.07 | 0.00 | 0.47 | 0.10 | 0.57 |
| N | 14 | 14.6 | 8.31 | 2.29 | 3.97 | 5.46 | 79.6 | 0.10 | 0.00 | 0.08 | 0.00 | 0.08 |
| O | 15 | 14.6 | 8.31 | 2.28 | 3.95 | 5.45 | 79.5 | 0.09 | 0.00 | 0.39 | 0.00 | 0.39 |
| P | 16 | 14.6 | 8.31 | 2.28 | 3.95 | 5.43 | 79.6 | 0.09 | 0.07 | 0.07 | 0.00 | 0.14 |
| Q | 17 | 14.6 | 8.33 | 2.28 | 4.00 | 5.50 | 79.4 | 0.10 | 0.00 | 0.01 | 0.07 | 0.10 |
| U | 41 | 14.4 | 10.69 | 3.68 | 0.00 | 5.18 | 79.6 | 0.09 | 0.24 | 0.51 | 0.00 | 0.75 |
| V | 42 | 14.4 | 10.70 | 3.67 | 0.00 | 5.18 | 79.3 | 0.09 | 0.49 | 0.51 | 0.00 | 1.00 |
| W | 43 | 14.4 | 10.79 | 3.65 | 0.00 | 5.29 | 77.3 | 0.07 | 1.95 | 0.48 | 0.00 | 2.43 |
| X | 44 | 14.8 | 11.05 | 3.78 | 0.00 | 5.34 | 78.0 | 0.08 | 0.54 | 0.49 | 0.05 | 1.08 |
| Y | 45 | 14.8 | 11.06 | 3.79 | 0.00 | 5.30 | 77.6 | 0.08 | 0.54 | 0.49 | 0.31 | 1.34 |
| Z | 46 | 14.4 | 10.69 | 3.70 | 0.00 | 5.06 | 76.0 | 0.09 | 0.14 | 0.47 | 0.11 | 0.72 |

TABLE 2

| Alloy | Experiment Example | Sintered magnet composition (at %) | | | | | | | | | |
|---|---|---|---|---|---|---|---|---|---|---|---|
| | | R in total | Nd | Pr | Dy | B | Fe | Si | Ga | Al | Cu |
| A | 18 | 14.5 | 12.32 | 2.16 | 0.00 | 5.25 | 76.6 | 0.77 | 0.07 | 0.34 | 0.10 |
| B | 19 | 15.0 | 12.85 | 2.16 | 0.00 | 5.27 | 76.0 | 0.78 | 0.07 | 0.34 | 0.10 |
| C | 20 | 13.9 | 11.75 | 2.13 | 0.00 | 5.25 | 77.2 | 0.76 | 0.07 | 0.35 | 0.10 |
| D | 21 | 14.8 | 12.63 | 2.16 | 0.00 | 5.12 | 76.3 | 0.78 | 0.07 | 0.37 | 0.10 |
| E | 22 | 13.7 | 7.54 | 2.26 | 3.86 | 5.18 | 77.5 | 0.76 | 0.07 | 0.33 | 0.07 |
| F | 23 | 14.0 | 7.91 | 2.29 | 3.84 | 5.26 | 76.9 | 0.78 | 0.07 | 0.35 | 0.07 |
| G | 24 | 14.8 | 8.53 | 2.31 | 3.93 | 5.35 | 76.2 | 0.79 | 0.07 | 0.36 | 0.07 |
| H | 25 | 13.9 | 7.87 | 2.26 | 3.80 | 4.86 | 77.6 | 0.78 | 0.07 | 0.36 | 0.07 |
| J | 26 | 13.7 | 3.18 | 2.23 | 8.24 | 5.36 | 76.5 | 1.50 | 0.07 | 0.36 | 0.07 |
| K | 27 | 14.3 | 3.71 | 2.23 | 8.32 | 5.41 | 75.9 | 1.50 | 0.07 | 0.34 | 0.07 |
| L | 28 | 13.2 | 2.71 | 2.23 | 8.19 | 5.30 | 77.2 | 1.48 | 0.07 | 0.33 | 0.07 |
| R | 29 | 14.0 | 7.90 | 2.25 | 3.84 | 5.24 | 73.2 | 4.71 | 0.00 | 0.33 | 0.10 |
| N | 30 | 14.6 | 8.31 | 2.29 | 3.97 | 5.46 | 79.6 | 0.81 | 0.00 | 0.08 | 0.00 |
| O | 31 | 14.6 | 8.31 | 2.28 | 3.95 | 5.45 | 79.5 | 0.80 | 0.00 | 0.39 | 0.00 |
| P | 32 | 14.6 | 8.31 | 2.28 | 3.95 | 5.43 | 79.6 | 0.80 | 0.07 | 0.07 | 0.00 |
| Q | 33 | 14.6 | 8.33 | 2.28 | 4.00 | 5.50 | 79.4 | 0.80 | 0.00 | 0.01 | 0.07 |

TABLE 3

| Alloy | Experiment Example | Sintered magnet composition (at %) | | | | | | | | | |
|---|---|---|---|---|---|---|---|---|---|---|---|
| | | R in total | Nd | Pr | Dy | B | Fe | Si | Ga | Al | Cu |
| S | 34 | 14.1 | 7.94 | 2.25 | 3.92 | 5.19 | 77.1 | 0.74 | 0.00 | 0.34 | 0.12 |

TABLE 4

| Alloy | Experiment Example | Area ratio of 2-17 phase-containing region (%) | Sq (%) | (BH)max (MGOe) | Br (kG) | Hcj (kOe) | Volume ratio of transition metal-rich phase (%) |
|---|---|---|---|---|---|---|---|
| A | 1 | 0.00 | 94.8 | 46.5 | 13.9 | 11.1 | — |
| B | 2 | 0.00 | 94.8 | 44.1 | 13.5 | 14.9 | — |
| C | 3 | 0.10 | 95.0 | 48.2 | 14.2 | 10.4 | 1.49 |
| D | 4 | 0.00 | 94.3 | 45.5 | 13.9 | 10.0 | — |
| E | 5 | — | 94.3 | 33.7 | 11.7 | 33.9 | — |
| F | 6 | 4.30 | 94.4 | 32.9 | 11.6 | 36.7 | 0.64 |
| G | 7 | — | 93.1 | 31.9 | 11.4 | 37.0 | 0.59 |
| H | 8 | 87.50 | 88.9 | 29.3 | 11.5 | 30.8 | — |
| I | 9 | 0.10 | 93.5 | 32.0 | 11.5 | 28.9 | — |
| J | 10 | 33.10 | 89.0 | 20.7 | 9.2 | 47.2 | — |
| K | 11 | 28.10 | 81.7 | 20.7 | 9.2 | 39.6 | — |
| L | 12 | 87.50 | 82.5 | 20.8 | 9.3 | 42.9 | 1.67 |
| T | 13 | — | 93.6 | 32.6 | 11.6 | 29.9 | 0.00 |
| N | 14 | — | 92.8 | 32.7 | 11.5 | 26.3 | — |
| O | 15 | — | 93.6 | 31.0 | 11.2 | 31.1 | — |
| P | 16 | — | 93.0 | 32.6 | 11.5 | 29.2 | — |
| Q | 17 | — | 94.3 | 31.6 | 11.3 | 28.6 | — |
| U | 41 | — | 93.1 | 41.7 | 13.2 | 18.3 | — |
| V | 42 | — | 93.5 | 42.7 | 13.3 | 18.0 | — |
| W | 43 | — | 93.2 | 41.1 | 13.1 | 13.7 | — |
| X | 44 | — | 94.9 | 42.1 | 13.2 | 19.6 | — |
| Y | 45 | — | 90.5 | 43.9 | 13.5 | 18.6 | — |
| Z | 46 | — | 93.8 | 45.0 | 13.7 | 18.5 | — |

TABLE 5

| Alloy | Experiment Example | Sq (%) | (BH)max (MGOe) | Br (kG) | Hcj (kOe) | Volume ratio of transition metal-rich phase (%) |
|---|---|---|---|---|---|---|
| A | 18 | 94.0 | 43.7 | 13.5 | 13.3 | — |
| B | 19 | 94.6 | 38.9 | 12.7 | 17.2 | — |
| C | 20 | 93.8 | 44.2 | 13.6 | 13.1 | 2.63 |
| D | 21 | 93.2 | 38.2 | 12.8 | 14.1 | — |
| E | 22 | 93.4 | 33.1 | 11.6 | 37.4 | — |
| F | 23 | 91.3 | 30.7 | 11.2 | 38.6 | 1.27 |
| G | 24 | 92.3 | 30.1 | 11.1 | 38.1 | 0.78 |
| H | 25 | 87.3 | 26.9 | 11.1 | 32.4 | — |
| J | 26 | 89.7 | 19.7 | 8.9 | 48.3 | — |
| K | 27 | 77.1 | 18.8 | 8.8 | 45.0 | — |
| L | 28 | 88.7 | 19.9 | 9.1 | 43.9 | 1.47 |
| R | 29 | 89.7 | 22.4 | 9.8 | 33.6 | — |
| N | 30 | 94.3 | 30.7 | 11.2 | 29.0 | — |
| O | 31 | 92.3 | 29.6 | 11.0 | 33.5 | — |
| P | 32 | 90.9 | 30.8 | 11.2 | 30.8 | — |
| Q | 33 | 94.3 | 30.0 | 11.0 | 40.3 | — |

TABLE 6

| Alloy | Experiment Example | Area ratio of 2-17 phase-containing region (%) | Sq (%) | (BH)max (MGOe) | Br (kG) | Hcj (kOe) | Volume ratio of transition metal-rich phase (%) |
|---|---|---|---|---|---|---|---|
| S | 34 | — | 92.9 | 31.4 | 11.3 | 35.8 | 0.19 |

In Tables 4 to 6, "Hcj" represents the coercive force, "Br" represents the remanence, "Sq" represents the squareness, and "BHmax" represents the maximum energy product. In addition, these magnetic properties are the average of measured values of five R-T-B-based magnets.

In addition, the volume ratios of the transition metal-rich phases in the R-T-B-based magnets of Experiment Examples 3 to 28 and 34 were investigated using the method described below.

The R-T-B-based magnet was embedded in a conductive resin, a surface in parallel with the orientation direction was cut, and mirror-polished. The surface was observed using a backscattered electron image at a magnification of approximately 1500 times, and the main phase, the R-rich phase and the transition metal-rich phase were determined using contrast.

Figure 9:
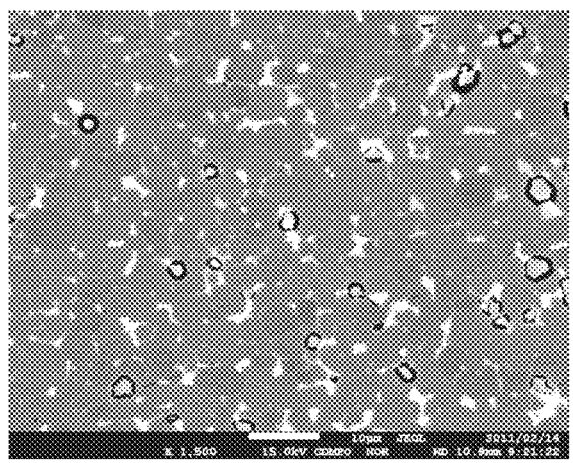
FIG. 9 is a microscope photograph of an R-T-B-based magnet and a backscattered electron image of an R-T-B-based magnet of Experiment Example 6.
Figure 10A:
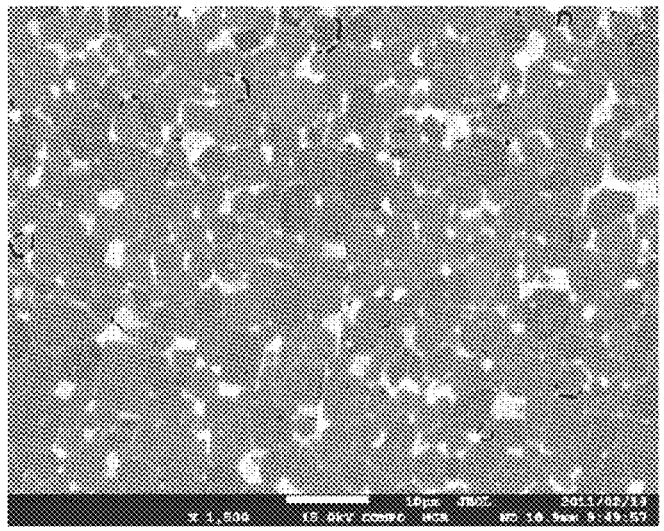
FIG. 10A is a microscope photograph of an R-T-B-based magnet of the invention and a backscattered electron image of an R-T-B-based magnet of Experiment Example 23.
Figure 10B:
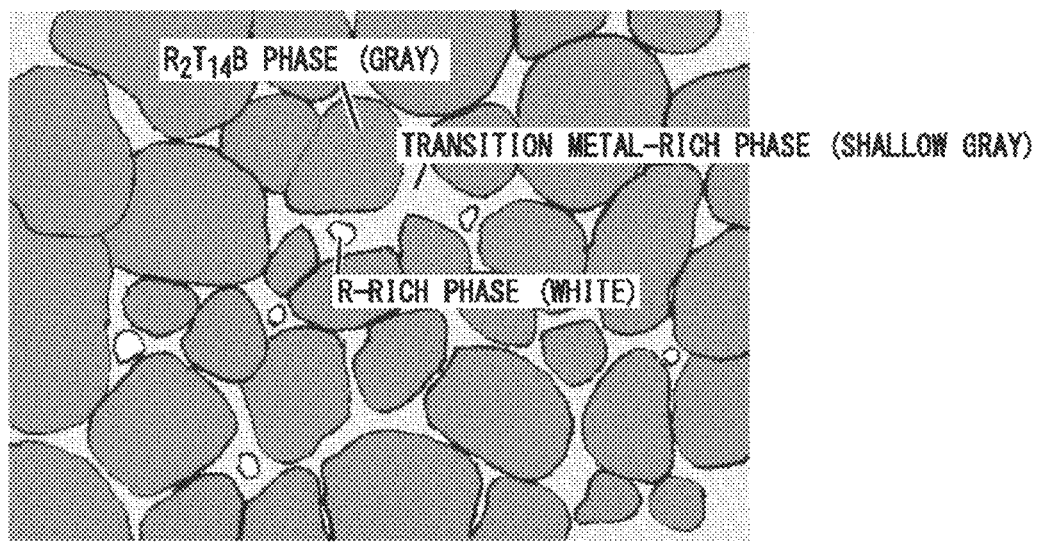
FIG. 10B is a schematic view for describing the microscope photograph of the R-T-B-based magnet illustrated in FIG. 10A.

For examples, FIGS. 9 and 10A are the backscattered electron images of the R-T-B-based magnets obtained in Experiment Examples 6 and 23 respectively. It is found from FIGS. 9 and 10A that white R-rich phases and light gray transition metal-rich phases are present in the grain boundaries of gray $R_2T_{14}B$ phases.

The area ratio of the transition metal-rich phases per cross-section was computed using the backscattered electron image, and, furthermore, the volume ratios of the respective experiment examples were computed with an assumption that the transition metal-rich phases are spherical.

The results are described in Tables 4 to 6. In Tables 4 to 6, symbol '-' indicates that the area ratio of the corresponding alloy is not measured.

In addition, it was confirmed that the R-T-B-based magnets of Experiment Examples 18 to 34 were mainly made up of the main phase containing $R_2Fe_{14}B$, the R-rich phase and the transition metal-rich phase by investigating the compositions of the main phase and the grain boundary phase using an electron probe micro analysis (FE-EPMA).

As described in Tables 1 and 4, in Experiment Examples 8 and 9 in which B does not satisfy Formula 1, the amounts of Dy are substantially the same, and the coercive forces (Hcj) are smaller than that in Experiment Example 6 in which B satisfies Formula 1.

In Experiment Example 23 in which the addition amount of Si is in a range of 0.7 at % to 1.5 at %, the coercive force (Hcj) is larger than that in Experiment Example 29 in which the amount of the additional metal exceeds the upper limit of the invention.

In addition, FIG. 1 is a graph illustrating the relationships between B/TRE (B represents a concentration (at %) of a boron element, and TRE represents a concentration (at %) of all the rare earth elements) and the coercive force (Hcj) of Experiment Examples 1 to 4 and 18 to 21. While the R-T-B-based magnets of Experiment Examples 1 to 4 and 18 to 21 do not contain Dy, the addition of Si which is the additional metal (Experiment Examples 18 to 21) increases the coercive force (Hcj) as illustrated in Experiment Examples 18 to 21.

At this time, the optimal width of B/TRE is estimated to be approximately ±0.1 with respect to the peak.

In addition, FIG. 2 is a graph illustrating the relationships between B/TRE (B represents a concentration (at %) of a boron element, and TRE represents a concentration (at %) of all the rare earth elements) and the coercive force (Hcj) of Experiment Examples 5 to 9 and 22 to 25. The R-T-B-based magnets of Experiment Examples 5 to 9 and 22 to 25 contain approximately 3.8 at % of Dy. The coercive forces are different due to the different amounts of B/TRE, and the coercive forces are at the maximum when B/TRE is 0.37. In addition, it is found that the addition of Si which is the additional metal (Experiment Examples 22 to 25) increases the coercive force as illustrated in Experiment Examples 22 to 25. At this time, the optimal width of B/TRE is estimated to be approximately ±0.1 with respect to the peak.

In addition, FIG. 3 is a graph illustrating the relationships between B/TRE (B represents a concentration (at %) of a boron element, and TRE represents a concentration (at %) of all the rare earth elements) and the coercive force (Hcj) of Experiment Examples 10 to 12 and 26 to 28. The R-T-B-based magnets of Experiment Examples 10 to 12 and 26 to 28 contain approximately 8.3 at % of Dy. The coercive forces are different due to the different amounts of B/TRE, and the coercive forces are at the maximum when B/TRE is 0.39.

In addition, it is found that the addition of Si which is the additional metal (Experiment Examples 24 to 26) increases the coercive force. At this time, the optimal width of B/TRE is estimated to be approximately ±0.1 with respect to the peak.

Experiment Example 14 is an alloy manufactured without adding Cu, Al, Ga and Si, and has a significantly smaller coercive force than Experiment Example 6 which has a most similar composition to Experiment Example 14. In Experiment Example 15 manufactured by adding only Al to the components of Experiment 14, Experiment Example 16 manufactured by adding only Ga to the components of Experiment 14 and Experiment Example 17 manufactured by adding only Cu to the components of Experiment 14, the coercive forces are larger than in Experiment Example 14. This indicates that any one of Al, Ga and Cu is essential in order to increase the coercive force.

Furthermore, in Experiment Examples 30 to 33 manufactured by adding Si to Alloys N to Q, the coercive forces are increased, which indicates that the addition of two or more metals M is preferable. Particularly, in Experiment Example 33 manufactured by adding Si powder to Alloy Q, a significant improvement of the coercive force is observed. In addition, in Experiment Example 33, the coercive force becomes 2 kOe or larger than that in Experiment Example 24 having a similar composition, which indicates that the addition of Cu and Si is particularly preferable.

When Experiment Examples 14 to 17 having substantially the same concentrations of Dy are compared, while the coercive force is small in Experiment Example 14 in which the concentration of the metallic element M is 0.08 at %, the coercive forces are large in Experiment Examples 15 to 17 in which the concentrations of the metallic element M is 0.1 at % or more.

In addition, when Experiment Examples 41 to 46 containing no Dy are compared, in Experiment Example 43 (the concentration of the metallic element M is 2.43 at %), the coercive force is smaller than those in Experiment Example 41 (the concentration of the metallic element M is 0.75 at %) and Experiment Example 42 (the concentration of the metallic element M is 1.00 at %).

Based on what has been described above, it is indicated that the amount of the metallic element M is preferably in a range of 0.1 at % to 2.4 at %.

Among Experiment Examples 1 to 4 and 41 to 46 containing no Dy, the coercive forces are large in Experiment Examples 41, 42 and 44 to 46 (the concentration of the metallic element M is in a range of 0.72 at % to 1.34 at %). Based on what has been described above, it is indicated that the amount of the metallic element M is preferably in a range of 0.7 at % to 1.4 at %.

Experiment Example 34 described in Tables 3 and 6 is an alloy manufactured by adding all metallic elements in the step of alloy casting. When Experiment Example 34 is compared with Experiment Example 5 in Tables 1 and 4, which have substantially the same amounts of Dy, it is found that Experiment Example 34 exhibits a larger coercive force than Experiment Example 5.

From the results of Tables 1 to 6, it is found that, both in a case in which the metallic elements are alloy-cast and a case in which an alloy and the additional metal are mixed, the effect that improves the coercive force of the magnet can be obtained.

Figure 8:
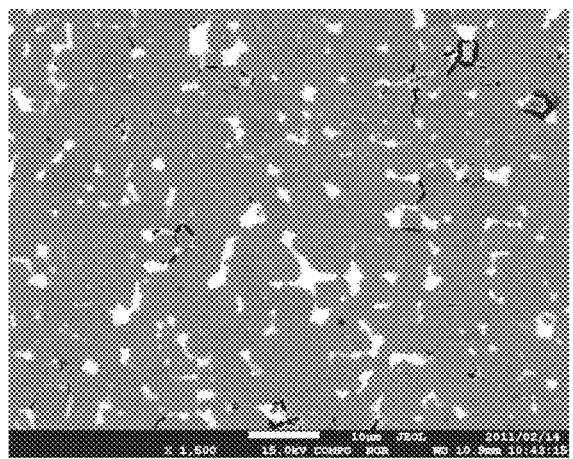
FIG. 8 is a microscope photograph of an R-T-B-based magnet and a backscattered electron image of an R-T-B-based magnet of Experiment Example 9.

FIGS. 8 to 10A are microscope photographs of the R-T-B-based magnets. FIG. 8 is a backscattered electron image of Experiment Example 9, FIG. 9 is a backscattered electron image of Experiment Example 6, and FIG. 10A is a backscattered electron image of Experiment Example 23. In addition, FIG. 10B is a schematic view for describing the microscope photograph of the R-T-B-based magnet illustrated in FIG. 10A. In the backscattered electron images illustrated in FIGS. 8 to 10A and the schematic view illustrated in FIG. 10B, the gray portions are the $R_2T_{14}B$ phase, the white portions are the R-rich phase, and the light gray portions are the transition metal-rich phase.

As described in Tables 1 and 2, the R-T-B-based magnets of Experiment Examples 6, 9 and 23 have substantially the same amounts of Dy. B/TRE of Experiment Example 9 is beyond the range of the invention. On the other hand, B/TRE of Experiment Example 6 is a value in the range of the invention, and Experiment Example 23 is an alloy manufactured by adding Si to Experiment Example 6. In FIG. 8, the transition metal-rich phase generated is rarely observed. It is found that, in FIG. 9, only a small amount of the transition metal-rich phase generated is observed and, in FIG. 10A, a larger amount of the transition metal-rich phase is generated. From FIGS. 8 to 10A, it is found that, when B/TRE is appropriately selected and, furthermore, the additional metal is appropriately added, it is possible to increase the generation of the transition metal-rich phase.

In FIG. 8, several crushed particles are molten so as to form the main phase. In FIG. 9, crushed particles are not mixed and individually form the main phases. In FIG. 10A, a shape in which the main phases formed of the respective crushed particles are surrounded by the grain boundary phases can be clearly observed.

Experiment Example 35

Nd metal (purity: 99 wt % or more), Pr metal (purity: 99 wt % or more), Dy metal (purity 99 wt % or more), Al metal (purity: 99 wt % or more), ferro-boron (Fe 80 wt %, B 20 wt %), iron ingot (purity: 99 wt % or more), Ga metal (purity: 99 wt % or more), Cu metal (purity: 99 wt % or more) and Co metal (purity: 99 wt % or more) were weighed so as to obtain the alloy compositions of Alloy S described in Table 7, and loaded in an alumina crucible.

TABLE 7

| Nd | Pr | Dy | Al | Fe | Ga | Cu | Co | B |
|---|---|---|---|---|---|---|---|---|
| 10.0 | 3.4 | 0.6 | 0.5 | bal. | 0.1 | 0.1 | 0.6 | 5.2 |

After that, thin cast alloy pieces were produced (casting step) using the production apparatus 1 of an alloy illustrated in FIG. 11. First, the inside of a high-frequency vacuum induction furnace (melting apparatus) into which the alumina crucible had been put was substituted with Ar, and heated to 1450° C., thereby preparing molten alloy. Next, the obtained molten alloy was supplied to a rotating copper roll with water cooling at a roll rotating rate of 1.0 m/second and solidified, thereby preparing a cast alloy. After that, the cast alloy was detached from the cooling roll 22, and made to pass between crushing rolls in the crushing apparatus 21 so as to be crushed, thereby obtaining thin cast alloy pieces having an average thickness of 0.3 mm. Meanwhile, the casting step was carried out in an argon atmosphere.

The crushed thin cast alloy pieces were made to pass through the hopper 7, stacked on the openable stages 33 in a "close" state, heated using the heater 31, a temperature retention step in which the 800° C.-hot cast alloy was maintained at a certain temperature for 60 seconds was carried out, and the openable stages 33 were set into a "open" state, thereby finishing the temperature retention step.

The thin cast alloy piece of Experiment Example 35 obtained in the above manner was embedded in a resin, a mirror-polished cross-section was observed using a backscattered electron image at a magnification of 350 times, the main phase and the alloy grain boundary phase were determined using contrast, and the distances between adjacent alloy grain boundary phases were investigated in the following manner. That is, straight lines were drawn at intervals of 10 μm in parallel with the cast surface on the respective images of the 350 times-magnified backscattered images of the thin cast alloy pieces of Experiment Example 35, the intervals between the alloy grain boundary phases traversing the straight lines were respectively measured, and the average value thereof was computed. As the distance between adjacent alloy grain boundary phases decreases, crushability becomes superior.

In addition, a plurality of thin cast alloy pieces that were the same as the thin cast alloy pieces of Experiment Example 35 except for the fact that the concentrations of the B element and the Fe element in the alloy compositions described in Table 7 were changed were prepared, and the distances between adjacent alloy grain boundary phases were investigated in the same manner as those of the thin cast alloy pieces of Experiment Example 35. The results are illustrated in FIGS. 12A to 12C, 13A and 13B.

Figure 12A:
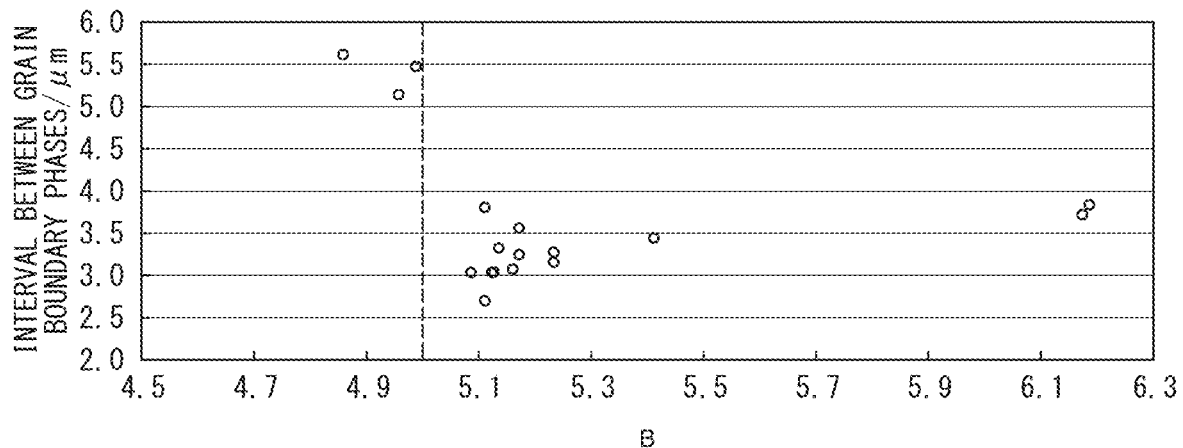
FIG. 12A is a graph illustrating a relationship between a distance between alloy grain boundary phases and a concentration of B.
Figure 12B:
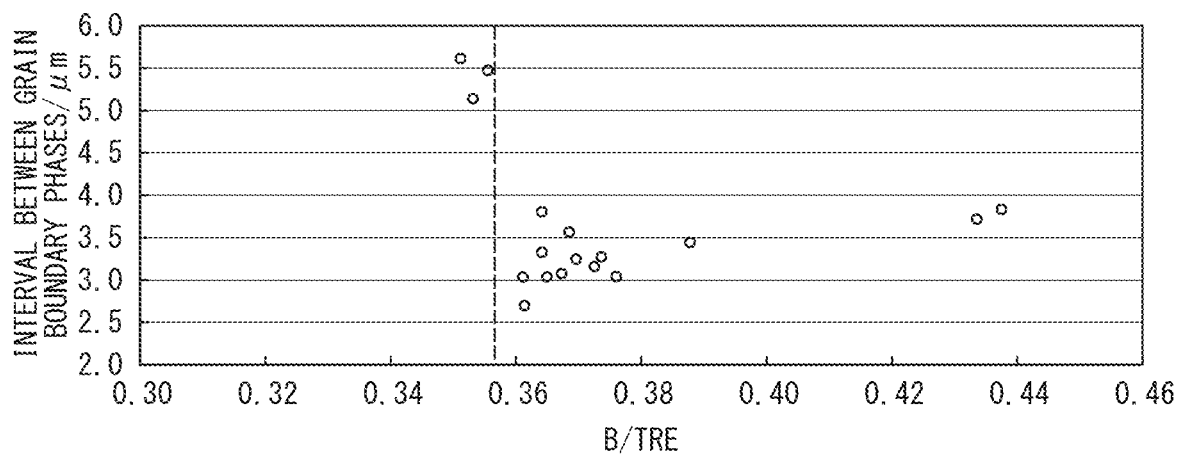
FIG. 12B is a graph illustrating a relationship between a distance between alloy grain boundary phases and B/TRE.
Figure 12C:
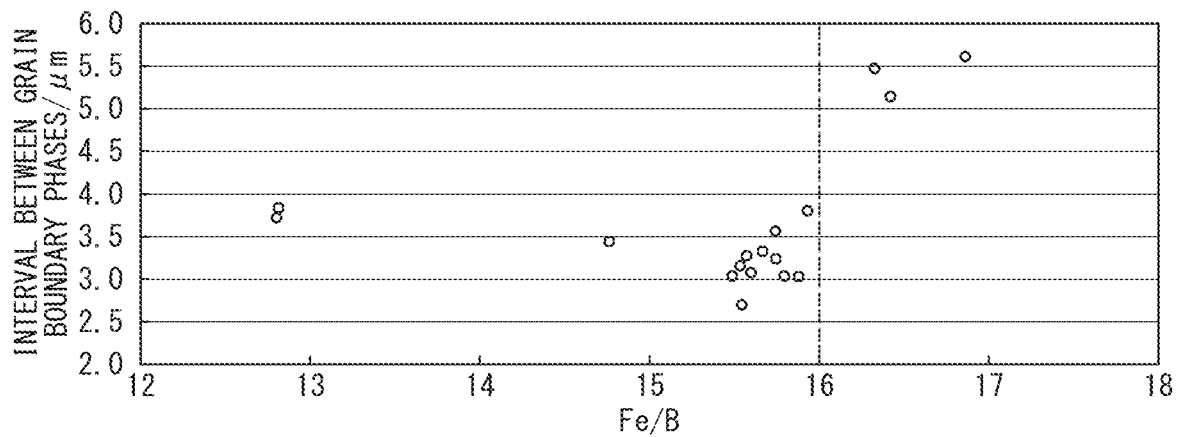
FIG. 12C is a graph illustrating a relationship between a distance between alloy grain boundary phases and Fe/B.

FIG. 12A is a graph illustrating the relationship between the distance between the alloy grain boundary phases and the concentration of B in the thin cast alloy pieces, FIG. 12B is a graph illustrating the relationship between the distance between the alloy grain boundary phases and B/TRE (B represents the concentration (at %) of the boron element and TRE represents the concentration (at %) of all rare earth elements) in the thin cast alloy pieces, and FIG. 12C is a graph illustrating the relationship between the distance between the alloy grain boundary phases and Fe/B (the ratio of the amount of Fe to the amount of B (B represents the concentration (at %) of the boron element and Fe represents the concentration (at %) of the iron element)) in the thin cast alloy pieces.

From FIG. 12A, it is found that, in a case in which the amount of B is in a range of 5.0 at % to 6.0 at %, the distances between the alloy grain boundary phases are short, and the grains become fine. In addition, it is found that, when the amount of B becomes smaller than 5.0 at %, the intervals between the alloy grain boundary phases abruptly widen.

From FIG. 12B, it is found that, in a case in which B/TRE is in a range of 0.355 to 0.38, the distances between the alloy grain boundary phases are short, and the grains become fine. In addition, it is found that, when B/TRE becomes less than 0.355, the intervals between the alloy grain boundary phases abruptly widen.

Figure 13A:
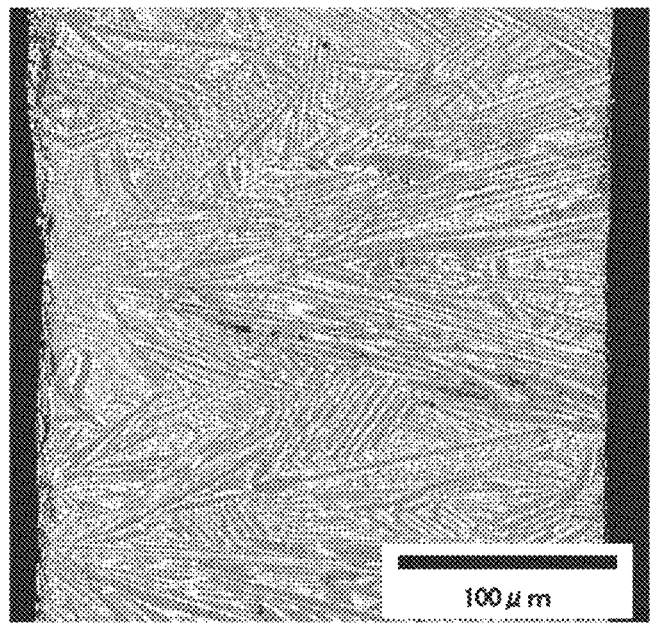
FIG. 13A is a microscope photograph of a cross-section of a thin cast alloy piece for which Fe/B is 15.5.
Figure 13B:
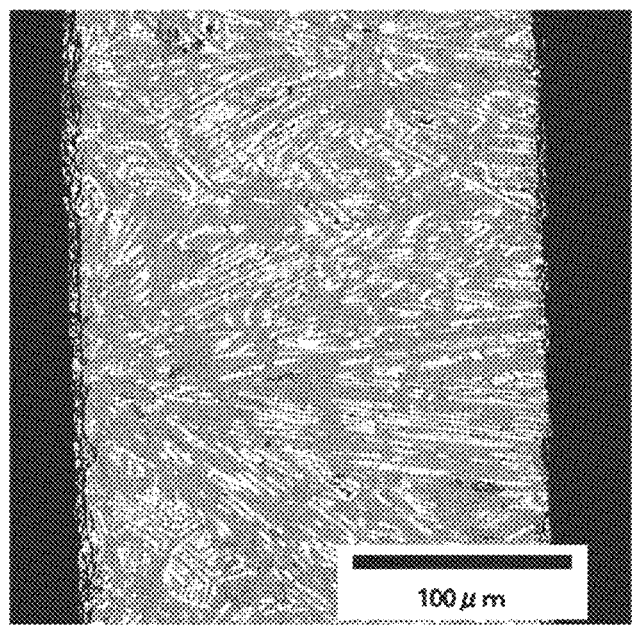
FIG. 13B is a microscope photograph of a cross-section of a thin cast alloy piece for which Fe/B is 16.4.

FIG. 13A is a microscope photograph of a cross-section of a thin cast alloy piece for which Fe/B is 15.5, and FIG. 13B is a microscope photograph of a cross-section of a thin cast alloy piece for which Fe/B is 16.4. In the backscattered electron images illustrated in FIGS. 13A and 13B, gray portions are the main phase and the white portions are the alloy grain boundary phase. It is found that, in the thin cast alloy piece illustrated in FIG. 13A, the alloy grain boundary phases form a fine net-like shape. In contrast to this, in the thin cast alloy piece illustrated in FIG. 13B, needle-like alloy grain boundary phases and island-like main phases are observed.

From FIG. 12C, it is found that, as Fe/B increases from 13, the intervals between the alloy grain boundary phases become narrow, and the distance between the alloy grain boundary phases become particularly short at Fe/B in a range of 15 to 16. In addition, from FIGS. 12C, 13A and 13B, it is found that, in a case in which Fe/B is in a range of 13 to 16, the distances between the alloy grain boundary phases become short and the grains become fine compared with a case in which Fe/B exceeds 16. In addition, from FIG. 12C, it is found that, when Fe/B exceeds 16, the intervals between the alloy grain boundary phases become abruptly wide.

Experiment Example 36

Thin cast alloy pieces were produced (casting step) in the same manner as in Experiment Example 35 except for the fact that the components were weighed to obtain the alloy composition described in table 7, loaded in an alumina crucible, and the atmosphere during the casting step was set to the following atmosphere using the production apparatus 1 of an alloy illustrated in FIG. 11.

That is, the casting step was carried out while supplying helium to an argon atmosphere, the cast alloy was cooled using the cooling roll 22 in an atmosphere containing helium, and, after the temperature retention step, the thin cast alloy pieces accommodated in the storage container 4 were cooled in the atmosphere containing helium.

Figure 14:
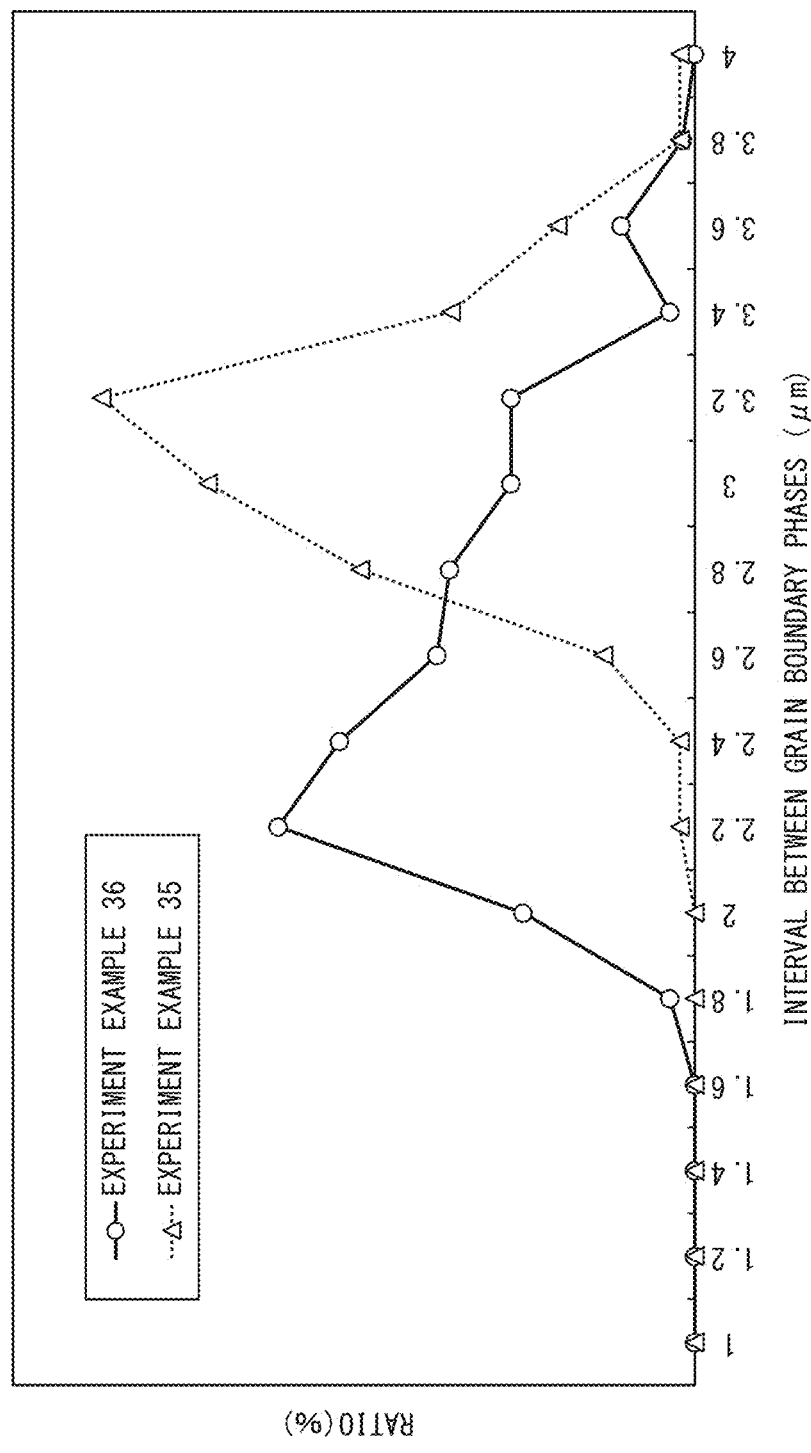
FIG. 14 is a graph illustrating distances between alloy grain boundary phases in Experiment Example 35 and distances between alloy grain boundary phases in Experiment Example 36.

For the thin cast alloy pieces of Experiment Example 36 obtained in the above manner, the distances between adjacent alloy grain boundary phases were investigated in the same manner as in Experiment Example 35. The results of the investigation of the distances between adjacent alloy grain boundaries of Experiment Examples 35 and 36 are illustrated in FIG. 14. In FIG. 14, black Δ indicates the results of Experiment Example 35, and • indicates the results of Experiment Example 36.

The graph illustrated in FIG. 14 illustrates the results obtained by preparing five thin cast alloy pieces of both Experiment Examples 35 and Experiment Examples 36, measuring the intervals between the alloy grain boundary phases in the same manner as described above, classifying the measured values of the respective intervals between the alloy grain boundary phases every 0.2 μm, and computing the ratios of the number of the measured values appearing in the respective ranges to the number of all the measured values of the intervals between the alloy grain boundary phases ((the number of the measured values appearing in each range/the number of all the measured values)×100(%)).

As illustrated in FIG. 14, in Experiment Example 36 which is the thin cast alloy pieces for which the casting step is carried out in an atmosphere containing helium, the intervals between the alloy grain boundaries become narrow compared with Experiment Example 35 which is the thin cast alloy pieces on which the casting step is carried out in an argon atmosphere. Based on what has been described above, it is found that, when the casting step is carried out in an atmosphere containing helium, the grain diameters in the alloy structure become small, and excellent crushability can be obtained.

Experiment Example 37

Figure 15A:
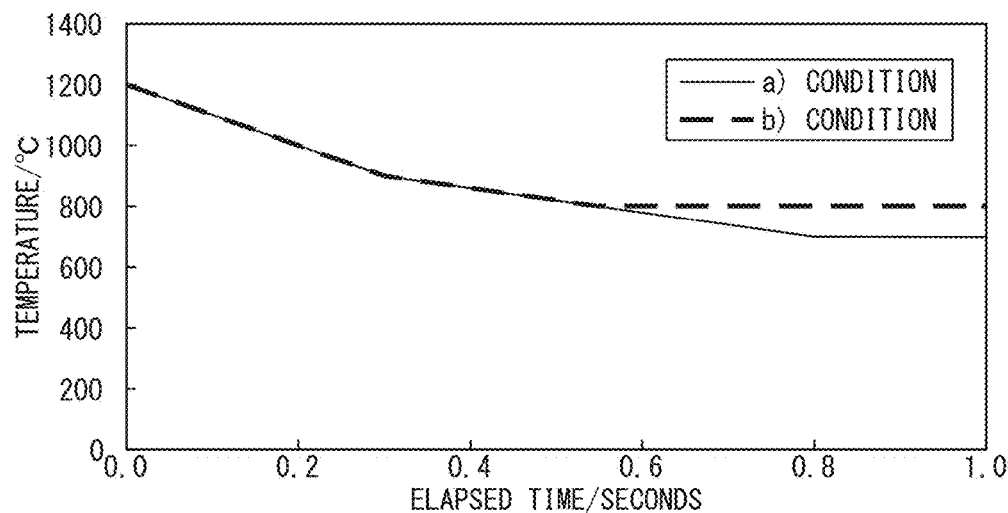
FIGS. 15A, 15B and 15C illustrate graphs showing relationships between an elapsed time for a produced cast alloy to reach 50° C. from 1200° C. and a temperature.
Figure 15B:
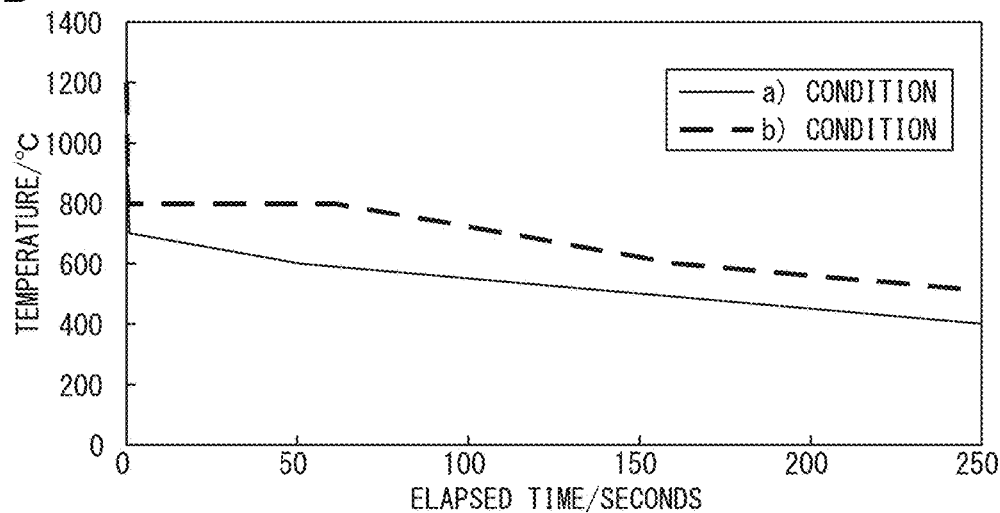
Figure 15C:
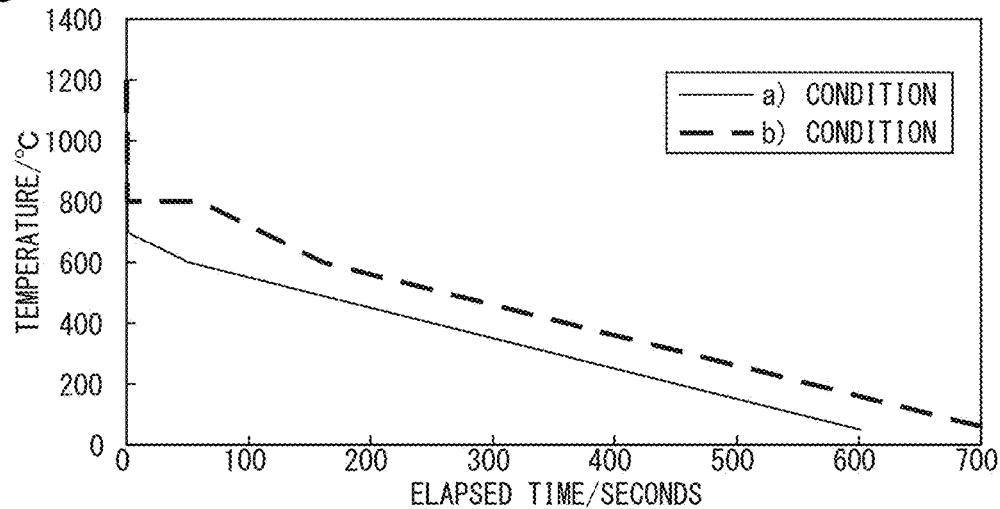

Thin cast alloy pieces were produced (casting step) in the same manner as in Experiment Example 35 except for the fact that the components were weighed to obtain the alloy composition of Alloy F described in Table 1, loaded in an alumina crucible, and the history of the cooling temperature while the temperature of the produced cast alloy reached 50° C. from 1200° C. was set to the (a) condition illustrated in FIGS. 15A to 15C and Table 8 using the production apparatus 1 of an alloy illustrated in FIG. 11.

TABLE 8

| a) condition | | | | b) condition | | | |
|---|---|---|---|---|---|---|---|
| Temperature (° C.) | Time (seconds) | Elapsed time (seconds) | Cooling rate (° C./second) | Temperature (° C.) | Time (seconds) | Elapsed time (seconds) | Cooling rate (° C./second) |
| 1200 | | 0 | | 1200 | | 0.0 | |
| 900 | 0.3 | 0.3 | 1000 | 900 | 0.3 | 0.3 | 1000 |
| 700 | 0.5 | 0.8 | 400 | 800 | 0.25 | 0.6 | 400 |
| 600 | 50 | 50.8 | 2 | 800 | 0 | 60.6 | 0 |
| 50 | 550 | 600.8 | 1 | 600 | 100 | 160.6 | 2 |
| | | | | 50 | 550 | 710.6 | 1 |

Next, the thin cast alloy pieces were cracked using the hydrogen decrepitation method in the same manner as in Experiment Example 1, thereby obtaining a powder-form R-T-B-based alloy of Experiment Example 37.

Meanwhile, the average grain size (d50) of the powder-form R-T-B-based alloy was 4.5 μm.

The powder-form R-T-B-based alloy of Experiment Example 37 obtained in the above manner was press-molded using a machine for molding in a transverse magnetic field at a molding pressure of 0.8 t/cm$^2$, thereby preparing green compact. After that, the obtained green compact was sintered at a temperature in a range of 900° C. to 1200° C. in a vacuum. After that, the green compact was thermally treated at two different temperatures of 800° C. and 500° C. and cooled, thereby manufacturing a plurality of R-T-B-based magnets of Experiment Example 37.

Figure 16A:
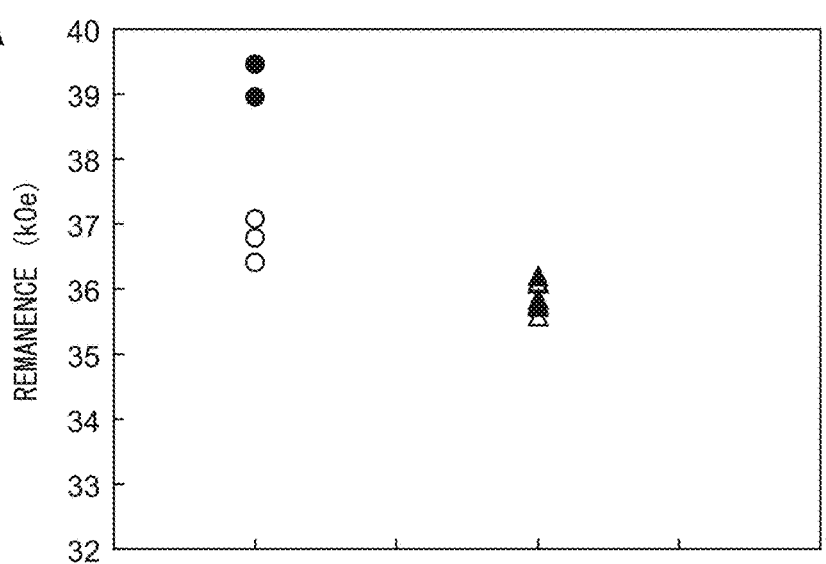
FIG. 16A is a graph illustrating coercive forces (Hcj) of R-T-B-based magnets of Experiment Examples 37 to 40.
Figure 16B:
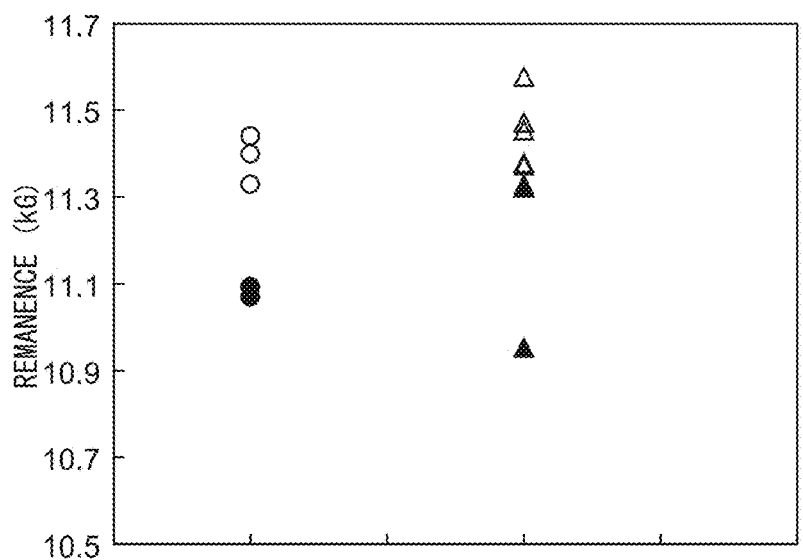
FIG. 16B is a graph illustrating remanence (Br) of the R-T-B-based magnets of Experiment Examples 37 to 40.
Figure 16C:
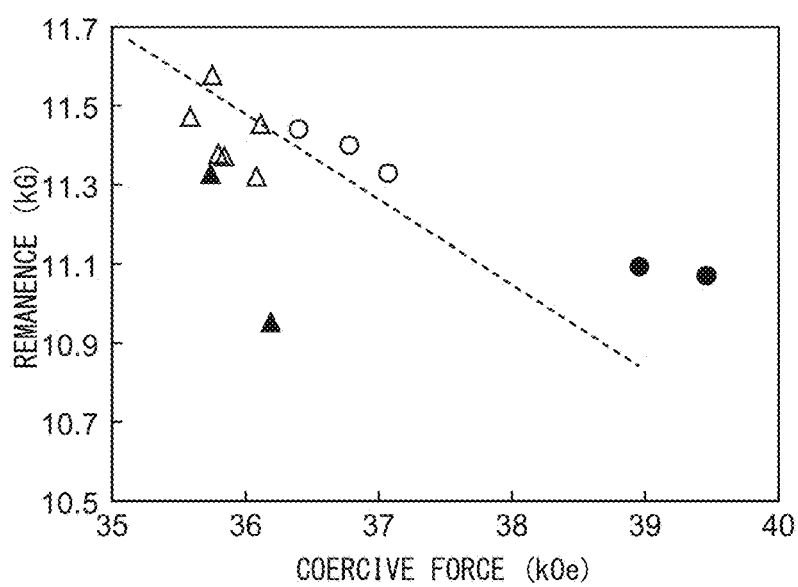
FIG. 16C is a graph illustrating a relationship between the remanence (Br) and coercive forces (Hcj) of the R-T-B-based magnets of Experiment Examples 37 to 40.

The magnetic properties of the plurality of the obtained R-T-B-based magnets of Experiment Example 37 were measured respectively using a BH curve tracer (TPM 2-10 manufactured by Toei Industry Co., Ltd.). The results are illustrated in FIGS. 16A to 16C.

Experiment Example 38

Thin cast alloy pieces were produced in the same manner as in Experiment Example 37 except for the fact that the history of the cooling temperature while the temperature of the produced cast alloy reached 50° C. from 1200° C. was set to the (b) condition illustrated in FIGS. 15A to 15C and Table 8, and a powder-form R-T-B-based alloy of Experiment Example 38 was obtained in the same manner as in Experiment Example 37 using the thin cast alloy pieces.

Meanwhile, the average grain size (d50) of the powder-form R-T-B-based alloy was 4.5 μm.

A plurality of R-T-B-based magnets of Experiment Example 38 were manufactured in the same manner as in Experiment Example 37 using the powder-form R-T-B-based alloy of Experiment Example 38 obtained in the above manner, and the magnetic properties of the plurality of the obtained R-T-B-based magnets of Experiment Example 38 were measured respectively using a BH curve tracer (TPM 2-10 manufactured by Toei Industry Co., Ltd.). The results are illustrated in FIGS. 16A to 16C.

Experiment Example 39

Powder made of the R-T-B-based alloy obtained in Experiment Example 37 and Si powder having an average grain size (d50) of 4.35 μm were prepared, and mixed so as to obtain the composition of Experiment Example 23 described in Table 2, thereby producing an R-T-B-based alloy material of Experiment Example 39. Meanwhile, the grain size of the Si powder was measured using a laser diffractometer.

Experiment Example 40

Powder made of the R-T-B-based alloy obtained in Experiment Example 38 and Si powder having an average grain size (d50) of 4.35 μm were prepared, and mixed so as to obtain the composition of Experiment Example 23 described in Table 2, thereby producing an R-T-B-based alloy material of Experiment Example 40. Meanwhile, the grain size of the Si powder was measured using a laser diffractometer.

Next, a plurality of R-T-B-based magnets of Experiment Example 39 and a plurality of R-T-B-based magnets of Experiment Example 40 were manufactured respectively in the same manner as in Experiment Example 37 using the R-T-B-based alloy materials of Experiment Examples 39 and 40 obtained in the above manner.

In addition, the magnetic eproperties of a plurality of the obtained R-T-B-based magnets of Experiment Examples 39 and 40 were measured using a BH curve tracer (TPM 2-10 manufactured by Toei Industry Co., Ltd.) in the same manner as in Experiment Example 37. The results are illustrated in FIGS. 16A to 16C.

FIG. 16A is a graph illustrating the coercive forces (Hcj) of the R-T-B-based magnets of Experiment Examples 37 to 40, FIG. 16B is a graph illustrating the remanence (Br) of the R-T-B-based magnets of Experiment Examples 37 to 40, and FIG. 16C is a graph illustrating the relationship between the remanence (Br) and coercive forces (Hcj) of the R-T-B-based magnets of Experiment Examples 37 to 40. Meanwhile, the dotted line illustrated in FIG. 16C represents an equivalent line. In addition, in FIGS. 16A to 16C, Δ indicates the results of Experiment Example 37, o indicates the results of Experiment Example 38, black Δ indicates the results of Experiment Example 39, and • indicates the results of Experiment Example 40.

As illustrated in FIG. 16A, the coercive forces (Hcj) were larger in Experiment Examples 38 and 40 in which the temperature retention step of maintaining the 800° C.-hot cast alloy at a certain temperature for 60 seconds was carried out than in Experiment Examples 37 and 39 in which the temperature retention step was not carried out. In addition, the coercive force (Hcj) was larger in the R-T-B-based magnet of Experiment Example 40 for which the Si-added R-T-B-based alloy material was used than in the R-T-B-based magnet of Experiment Example 38 for which the R-T-B-based alloy material to which no Si had been added was used.

As illustrated in FIG. 16B, the remanence (Br) differences were small when Experiment Examples 38 and 40 in which the temperature retention step was carried out and Experiment Example 37 and 39 in which the temperature retention step was not carried out were compared and when the R-T-B-based magnets of Experiment Examples 39 and 40 in which the Si-added R-T-B-based alloy material was used and the R-T-B-based magnets of Experiment Example 37 and 38 in which the R-T-B-based alloy material to which no Si had been added was used were compared.

As illustrated in FIG. 16C, it is found that Experiment Examples 38 and 40 in which the temperature retention step was carried out are located on the right side of the equivalent line, and have a larger coercive force than cases in which the temperature retention step was not carried out.

Experiment Example 47

The powder-form R-T-B-based alloy produced to obtain the composition of the sintered magnet of Experiment Example 47 described in Table 9 was press-molded using a machine for molding in a transverse magnetic field at a molding pressure of 0.8 t/cm$^2$, thereby preparing green compact. After that, the obtained green compact was sintered at a temperature in a range of 900° C. to 1200° C. in a vacuum. After that, the green compact was thermally treated at two different temperatures of 800° C. and 500° C. and cooled, thereby manufacturing an R-T-B-based magnets of Experiment Example 47.

Experiment Example 48

A coating fluid containing Dy was applied to a surface of the thermally treated R-T-B-based magnet produced in the same manner as in Experiment Example 47. As the coating fluid containing Dy, a mixture obtained by mixing ethanol and dysprosium fluoride (DyF$_3$) at a weight ratio of 1:1 was used. In addition, the coating fluid was applied to the surface of the R-T-B-based magnet by immersing the sintered R-T-B-based magnet in a container for 1 minute while ultrasonic-dispersing the coating fluid in the container.

Subsequently, the first thermal treatment in which the R-T-B-based magnet to which the coating fluid had been applied was heated at a temperature of 900° C. for one hour in an argon atmosphere to which argon was supplied at a flow rate of 100 ml/min was carried out, and the R-T-B-based magnet was cooled to room temperature. After that, the second thermal treatment in which the R-T-B-based magnet was heated at a temperature of 500° C. for one hour in the same atmosphere as in the first thermal treatment was carried out, and the R-T-B-based magnet was cooled to room temperature (diffusion step), thereby obtaining an R-T-B-based magnet of Experiment Example 48.

Experiment Example 49

An R-T-B-based magnet of Experiment Example 49 was obtained in the same manner as in Experiment Example 47 except for the fact that a powder-form R-T-B-based alloy produced to obtain the composition of the sintered magnet of Experiment Example 49 described in Table 9 was used.

Experiment Example 50

A diffusion step in which a coating fluid containing Dy was applied to a surface of a thermally treated R-T-B-based magnet produced in the same manner as in Experiment Example 49 in the same manner as in Experiment Example 48 was carried out, thereby obtaining an R-T-B-based magnet of Experiment Example 50.

Regarding the compositions of the R-T-B-based magnets of Experiment Examples 47 to 50 obtained in the above manner, the rare earth elements, iron, copper, cobalt, aluminum, gallium and boron were measured using fluorescent X-ray analysis (XRF); carbon, nitrogen and oxygen were measured using a gas analysis apparatus; and other impurity elements contained in a small amount were measured using induced coupling plasma emission spectrometry (ICP). The results are described in Table 9.

When Experiment Examples 47 and 48 described in Table 9 are compared, when the diffusion step in which a thermal treatment is carried out by applying the coating fluid containing Dy is completed, the concentration of Dy contained in the R-T-B-based magnet increases. In addition, when Experiment Examples 49 and 50 described in Table 9 are

TABLE 9

| Experiment Example | Magnet composition (at %) | | | | | | | | | | |
|---|---|---|---|---|---|---|---|---|---|---|---|
| | R in total | Nd | Pr | Dy | B | Fe | Si | Ga | Al | Cu | M |
| 47 | 14.8 | 11.05 | 3.79 | 0.00 | 5.62 | 77.8 | 0.08 | 0.54 | 0.49 | 0.21 | 1.2 |
| 48 | 14.9 | 11.05 | 3.79 | 0.10 | 5.62 | 77.8 | 0.08 | 0.54 | 0.49 | 0.21 | 1.2 |
| 49 | 14.1 | 13.96 | 0.14 | 0.00 | 5.77 | 80.2 | 0.00 | 0.23 | 0.20 | 0.09 | 0.5 |
| 50 | 14.1 | 13.96 | 0.14 | 0.03 | 5.77 | 80.2 | 0.00 | 0.23 | 0.20 | 0.09 | 0.5 | compared, when the diffusion step is carried out, the concentration of Dy contained in the R-T-B-based magnet increases.

In addition, the magnet compositions of Experiment Examples 47 and 48 described in Table 9 are in the range of the invention, and the magnet compositions of Experiment Examples 49 and 50 have a value of "B/TRE" outside the range of the invention.

In addition, the R-T-B-based magnets of Experiment Examples 47 and 48 were embedded in a conductive resin respectively, a surface in parallel with the orientation direction was cut, and mirror-polished. The surface was observed using a backscattered electron image at a magnification of approximately 1500 times, and the main phase, the R-rich phase and the transition metal-rich phase were determined using contrast.

Furthermore, for the R-T-B-based magnets of Experiment Examples 47 and 48, the compositions of the main phase and the grain boundary phase (the R-rich phase and the transition metal-rich phase) were confirmed using an electron probe micro analyzer (FE-EPMA) respectively.

As a result, the R-T-B-based magnets of Experiment Examples 47 and 48 which are the examples of the invention included the main phase, the R-rich phase and the transition metal-rich phase.

Figure 17A:
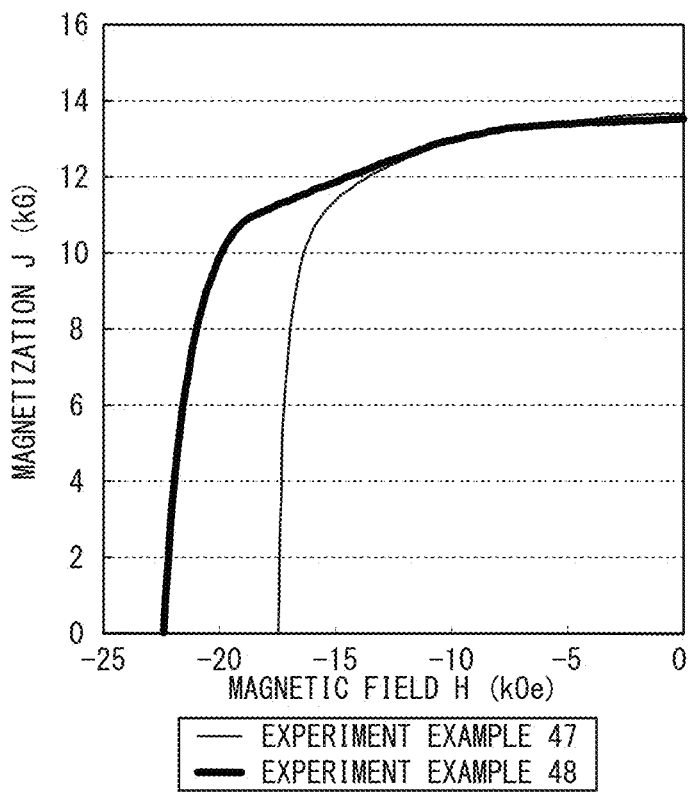
FIG. 17A is a graph illustrating second quadrants of hysteresis curves of Experiment Examples 47 and 48 measured using a BH curve tracer.
Figure 17B:
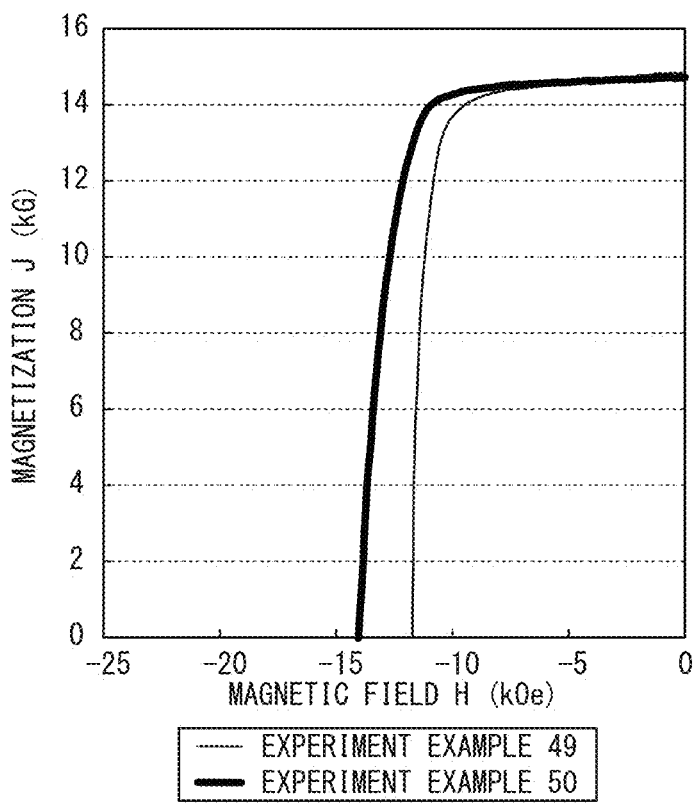
FIG. 17B is a graph illustrating second quadrants of hysteresis curves of Experiment Examples 49 and 50 measured using a BH curve tracer. The vertical axis indicates magnetization J, and the horizontal axis indicates magnetic fields H.

In addition, the magnetic properties of the R-T-B-based magnets of Experiment Examples 47 to 50 were measured respectively using a BH curve tracer (TPM 2-10 manufactured by Toei Industry Co., Ltd.). The results are illustrated in FIGS. 17A and 17B and Tables 10 and 11.

TABLE 10

|  | Experiment Example 47 | Experiment Example 48 | Difference |
|---|---|---|---|
| Br (kG) | 13.67 | 13.52 | −0.15 |
| Hcj (kOe) | 17.47 | 22.41 | 4.95 |

TABLE 11

|  | Experiment Example 49 | Experiment Example 50 | Difference |
|---|---|---|---|
| Br (kG) | 14.84 | 14.72 | −0.13 |
| Hcj (kOe) | 11.72 | 14.04 | 2.32 |

In Tables 10 and 11, "Hcj" represents the coercive force, and "Br" represents the remanence. In addition, these magnetic properties are the average of measured values of five R-T-B-based magnets respectively.

FIG. 17A is a graph illustrating the second quadrants of the hysteresis curves of Experiment Examples 47 and 48, and FIG. 17B is a graph illustrating the second quadrants of the hysteresis curves of Experiment Examples 49 and 50. Here, the vertical axis indicates magnetization J, and the horizontal axis indicates magnetic fields H. The hysteresis curves illustrated in FIGS. 17A and 17B were measured using a BH curve tracer (TPM 2-10 manufactured by Toei Industry Co., Ltd.). In FIGS. 17A and 17B, the points at which the curves intersect the horizontal axes indicate the values of the coercive force (Hcj), and the points at which the curves intersect the vertical axes indicate the values of the remanence "Br".

As illustrated in FIG. 17A and Table 10, the coercive force is significantly improved in Experiment Example 48 in which the diffusion step was carried out compared with Experiment Example 47. In addition, when Experiment Examples 47 and 48 are compared, the remanence slightly changes.

As illustrated in FIG. 17B and Table 11, the coercive force is improved in Experiment Example 50 in which the diffusion step was carried out compared with Experiment Example 49, but the change is smaller than the difference between Experiment Examples 47 and 48 illustrated in FIG. 17A and Table 10, and the effect that improves the coercive force being small. In addition, when Experiment Examples 50 and 49 are compared, the remanence slightly changes.

INDUSTRIAL APPLICABILITY

The invention can be applied to an alloy for R-T-B-based rare earth sintered magnets and an alloy material for R-T-B-based rare earth sintered magnets which have excellent magnetic properties and from which R-T-B-based rare earth sintered magnets that are a preferable material for motors can be obtained.

REFERENCE SIGNS LIST

1 PRODUCTION APPARATUS
2 CASTING APPARATUS
3 HEATING APPARATUS
4 STORAGE CONTAINER
5 CONTAINER
6 CHAMBER
6a CASTING CHAMBER
6b HEAT RETENTION AND STORAGE CHAMBER
7 HOPPER
21 CRUSHING APPARATUS
31 HEATING HEATER
32 OPENABLE STAGE GROUP
33 OPENABLE STAGE

What is claimed is:
1. An R-T-B-based rare earth sintered magnet comprising:
R which is a rare earth element except for Dy and Tb;
T which is a transition metal essentially comprising Fe;
a metallic element M comprising Ga, or
comprising Ga and one or more metals selected from the group consisting of Al and Cu;
B; and
inevitable impurities,
wherein the R-T-B-based rare earth sintered magnet does not contain Dy and Tb,
wherein R accounts for 13 at % to 15 at %, B accounts for 5.06 at % to 5.34 at %, M accounts for 0.1 at % to 2.4 at %, Si accounts for 0.09 at % or less, T accounts for the balance, and the following Formula 1 is satisfied,

$$0.34 \leq cB/TRE \leq 0.36 \quad \text{Formula 1}$$

wherein cB represents a concentration at % of a boron element, and TRE represents a concentration at % of all the rare earth elements;
wherein the R-T-B-based rare earth sintered magnet is made of a sintered body including a main phase primarily comprising $R_2Fe_{14}B$ and a grain boundary comprising more R than the main phase, in which the grain boundary phase includes a phase having a concentration of all atoms of the rare earth elements of 70 at % or more and a phase having a concentration of all the atoms of the rare earth elements in a range of 25 at % to 35 at %; and
wherein Ga accounts for 0.24 at % to 1.95 at % but at least 0.52 wt % in the R-T-B-based rare earth sintered magnet.

2. The R-T-B-based rare earth sintered magnet according to claim 1,
wherein a volume ratio of the phase having a concentration of all the atoms of the rare earth elements in a range of 25 at % to 35 at % is in a range of 0.005 vol. % to 3 vol. %.

3. A motor including the R-T-B-based rare earth sintered magnet according to claim 1.

4. The R-T-B-based rare earth sintered magnet according to claim 1,
further comprising Nd,
wherein an amount of Nd is 70 at % or more among the rare earth elements R.

5. The R-T-B-based rare earth sintered magnet according to claim 1,
further comprising Nd,
wherein an amount of Nd is 75 at % or more among the rare earth elements R.

6. The R-T-B-based rare earth sintered magnet according to claim 1, wherein Ga accounts for 0.49 at % to 0.54 at % in the R-T-B based rare earth sintered magnet.

* * * * *